United States Patent
Zhu et al.

(10) Patent No.: US 10,051,446 B2
(45) Date of Patent: Aug. 14, 2018

(54) POWER REPORTS IN WIRELESS SCANNER SYSTEMS

(71) Applicant: Hand Held Products, Inc., Fort Mill, SC (US)

(72) Inventors: Qinrong Zhu, Suzhou (CN); Feng Qian, Tongzhou (CN); Zhongqi Liu, Suzhou (CN); Zhifa Zong, Suzhou (CN)

(73) Assignee: Hand Held Products, Inc., Fort Mill, SC (US)

( * ) Notice: Subject to any disclaimer, the term of this patent is extended or adjusted under 35 U.S.C. 154(b) by 71 days.

(21) Appl. No.: 15/058,181

(22) Filed: Mar. 2, 2016

(65) Prior Publication Data

US 2016/0261995 A1    Sep. 8, 2016

(30) Foreign Application Priority Data

Mar. 6, 2015 (CN) ............. 2015 2 0129333 U

(51) Int. Cl.
*G08B 21/00* (2006.01)
*H04W 4/20* (2018.01)
(Continued)

(52) U.S. Cl.
CPC .......... *H04W 4/20* (2013.01); *G08B 5/36* (2013.01); *G08B 21/182* (2013.01); *G08B 25/08* (2013.01); *H04W 24/04* (2013.01)

(58) Field of Classification Search
CPC .......... H04W 4/20; H04W 24/04; G08B 5/36; G08B 21/182; G08B 25/08
(Continued)

(56) References Cited

U.S. PATENT DOCUMENTS 6,215,992 B1 *   4/2001   Howell ............... G10L 15/30
                                              455/412.1
6,832,725 B2    12/2004   Gardiner et al.
(Continued)

FOREIGN PATENT DOCUMENTS

WO    2013163789 A1    11/2013
WO    2013173985 A1    11/2013
(Continued)

OTHER PUBLICATIONS

Notice of Grant in counterpart CN Application No. 201520129333.4 dated Jul. 27, 2015, pp. 1-2.
(Continued)

*Primary Examiner* — Jack K Wang
(74) *Attorney, Agent, or Firm* — Additon, Higgins & Pendleton, P.A.

(57) ABSTRACT

Power level information is presented for a mobile device used with a scanner for processing information scanned therewith. The mobile device is polled from the RF scanner, in relation to a power level present in a battery source thereof. Responsive to the polling, checked power level data is reported to the scanner, processed and evaluated. Upon the evaluation detecting that the mobile device battery power level is low, presentation of a corresponding alert is commanded. The alert is presented on an indicator of the RF scanner. Data corresponding to the alert may also be presented at the mobile device and a remote computer.

20 Claims, 9 Drawing Sheets

(51) Int. Cl.
*G08B 21/18* (2006.01)
*H04W 24/04* (2009.01)
*G08B 5/36* (2006.01)
*G08B 25/08* (2006.01)
*H04N 7/00* (2011.01)
*H04B 5/00* (2006.01)
*G06F 1/00* (2006.01)

(58) Field of Classification Search
USPC .................................................... 340/636.1
See application file for complete search history.

(56) References Cited

U.S. PATENT DOCUMENTS

| | | | |
|---|---|---|---|
| 7,128,266 B2 | 10/2006 | Marlton et al. |
| 7,159,783 B2 | 1/2007 | Walczyk et al. |
| 7,413,127 B2 | 8/2008 | Ehrhart et al. |
| 7,726,575 B2 | 6/2010 | Wang et al. |
| 8,294,969 B2 | 10/2012 | Plesko |
| 8,317,105 B2 | 11/2012 | Kotlarsky et al. |
| 8,322,622 B2 | 12/2012 | Suzhou et al. |
| 8,366,005 B2 | 2/2013 | Kotlarsky et al. |
| 8,371,507 B2 | 2/2013 | Haggerty et al. |
| 8,376,233 B2 | 2/2013 | Van Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,736,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |

(56) References Cited

U.S. PATENT DOCUMENTS

| | | |
|---|---|---|
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 9,224,022 B2 | 12/2015 | Ackley et al. |
| 9,224,027 B2 | 12/2015 | Van Horn et al. |
| D747,321 S | 1/2016 | London et al. |
| 9,230,140 B1 | 1/2016 | Ackley |
| 9,443,123 B2 | 1/2016 | Hejl |
| 9,250,712 B1 | 2/2016 | Todeschini |
| 9,258,033 B2 | 2/2016 | Showering |
| 9,262,633 B1 | 2/2016 | Todeschini et al. |
| 9,310,609 B2 | 4/2016 | Rueblinger et al. |
| D757,009 S | 5/2016 | Oberpriller et al. |
| 9,342,724 B2 | 5/2016 | McCloskey |
| 9,375,945 B1 | 6/2016 | Bowles |
| D760,719 S | 7/2016 | Zhou et al. |
| 9,390,596 B1 | 7/2016 | Todeschini |
| D762,604 S | 8/2016 | Fitch et al. |
| D762,647 S | 8/2016 | Fitch et al. |
| 9,412,242 B2 | 8/2016 | Van Horn et al. |
| D766,244 S | 9/2016 | Zhou et al. |
| 9,443,222 B2 | 9/2016 | Singel et al. |
| 9,478,113 B2 | 10/2016 | Xie et al. |
| 2007/0063048 A1 | 3/2007 | Havens et al. |
| 2009/0134221 A1 | 5/2009 | Zhu et al. |
| 2009/0248883 A1* | 10/2009 | Suryanarayana ........ G06F 8/65 709/229 |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0169999 A1 | 7/2011 | Grunow et al. |
| 2011/0202554 A1* | 8/2011 | Powilleit ................ H04L 41/06 707/769 |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0221877 A1* | 8/2012 | Prabu ................ H04W 52/0235 713/340 |
| 2012/0223141 A1 | 9/2012 | Good et al. |
| 2013/0043312 A1 | 2/2013 | Van Horn |
| 2013/0075168 A1 | 3/2013 | Amundsen et al. |
| 2013/0109375 A1* | 5/2013 | Zeiler ................ H04W 4/029 455/426.1 |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0281013 A1* | 10/2013 | Hillan .................... H04B 5/02 455/41.1 |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0313325 A1 | 11/2013 | Wilz et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |

(56) References Cited

U.S. PATENT DOCUMENTS

| | | |
|---|---|---|
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0121438 A1 | 5/2014 | Kearney |
| 2014/0121445 A1 | 5/2014 | Fontenot et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131441 A1 | 5/2014 | Nahill et al. |
| 2014/0131443 A1 | 5/2014 | Smith |
| 2014/0131444 A1 | 5/2014 | Wang |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Lui et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071818 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chang et al. |
| 2015/0169929 A1 | 6/2015 | Williams et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |
| 2015/0210199 A1 | 7/2015 | Payne |
| 2015/0220753 A1 | 8/2015 | Zhu et al. |
| 2015/0254485 A1 | 9/2015 | Feng et al. |
| 2015/0327012 A1 | 11/2015 | Bian et al. |
| 2016/0014251 A1 | 1/2016 | Hejl |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0109219 A1 | 4/2016 | Ackley et al. |
| 2016/0109220 A1 | 4/2016 | Laffargue |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0133253 A1 | 5/2016 | Braho et al. |
| 2016/0171720 A1 | 6/2016 | Todeschini |
| 2016/0178479 A1 | 6/2016 | Goldsmith |
| 2016/0180678 A1 | 6/2016 | Ackley et al. |
| 2016/0189087 A1 | 6/2016 | Morton et al. |
| 2016/0125873 A1 | 7/2016 | Braho et al. |

(56) References Cited

U.S. PATENT DOCUMENTS

| | | | |
|---|---|---|---|
| 2016/0227912 A1 | 8/2016 | Oberpriller et al. | |
| 2016/0232891 A1 | 8/2016 | Pecorari | |
| 2016/0261995 A1 | 9/2016 | Zhu et al. | |
| 2016/0292477 A1 | 10/2016 | Bidwell | |
| 2016/0294779 A1 | 10/2016 | Yeakley et al. | |
| 2016/0306769 A1 | 10/2016 | Kohtz et al. | |
| 2016/0314276 A1 | 10/2016 | Sewell et al. | |
| 2016/0314294 A1 | 10/2016 | Kubler et al. | |
| 2017/0140185 A1* | 5/2017 | Wu | G06K 7/10386 |

FOREIGN PATENT DOCUMENTS

| | | |
|---|---|---|
| WO | 2014019130 A1 | 2/2014 |
| WO | 2014110495 A1 | 7/2014 |

OTHER PUBLICATIONS

English-translation of Notice of Grant in counterpart CN Application No. 201520129333.4 dated Jul. 27, 2015, pp. 1.

U.S. Appl. No. 13/367,978, filed Feb. 7, 2012, (Feng et al.); now abandoned.

U.S. Appl. No. 14/277,337 for Multipurpose Optical Reader, filed May 14, 2014 (Jovanovski et al.); 59 pages; now abandoned.

U.S. Appl. No. 14/446,391 for Multifunction Point of Sale Apparatus With Optical Signature Capture filed Jul. 30, 2014 (Good et al.); 37 pages; now abandoned.

U.S. Appl. No. 29/516,892 for Table Computer filed Feb. 6, 2015 (Bidwell et al.); 13 pages.

U.S. Appl. No. 29/523,098 for Handle for a Tablet Computer filed Apr. 7, 2015 (Bidwell et al.); 17 pages.

U.S. Appl. No. 29/528,890 for Mobile Computer Housing filed Jun. 2, 2015 (Fitch et al.); 61 pages.

U.S. Appl. No. 29/526,918 for Charging Base filed May 14, 2015 (Fitch et al.); 10 pages.

U.S. Appl. No. 14/715,916 for Evaluating Image Values filed May 19, 2015 (Ackley); 60 pages.

U.S. Appl. No. 29/525,068 for Tablet Computer With Removable Scanning Device filed Apr. 27, 2015 (Schulte et al.); 19 pages.

U.S. Appl. No. 29/468,118 for an Electronic Device Case, filed Sep. 26, 2013 (Oberpriller et al.); 14 pages.

U.S. Appl. No. 29/530,600 for Cyclone filed Jun. 18, 2015 (Vargo et al); 16 pages.

U.S. Appl. No. 14/707,123 for Application Independent DEX/UCS Interface filed May 8, 2015 (Pape); 47 pages.

U.S. Appl. No. 14/283,282 for Terminal Having Illumination and Focus Control filed May 21, 2014 (Liu et al.); 31 pages; now abandoned.

U.S. Appl. No. 14/705,407 for Method and System to Protect Software-Based Network-Connected Devices From Advanced Persistent Threat filed May 6, 2015 (Hussey et al.); 42 pages.

U.S. Appl. No. 14/704,050 for Intermediate Linear Positioning filed May 5, 2015 (Charpentier et al.); 60 pages.

U.S. Appl. No. 14/705,012 for Hands-Free Human Machine Interface Responsive to a Driver of a Vehicle filed May 6, 2015 (Fitch et al.); 44 pages.

U.S. Appl. No. 14/715,672 for Augumented Reality Enabled Hazard Display filed May 19, 2015 (Venkatesha et al.); 35 pages.

U.S. Appl. No. 14/735,717 for Indicia-Reading Systems Having an Interface With a User's Nervous System filed Jun. 10, 2015 (Todeschini); 39 pages.

U.S. Appl. No. 14/702,110 for System and Method for Regulating Barcode Data Injection Into a Running Application on a Smart Device filed May 1, 2015 (Todeschini et al.); 38 pages.

U.S. Appl. No. 14/747,197 for Optical Pattern Projector filed Jun. 23, 2015 (Thuries et al.); 33 pages.

U.S. Appl. No. 14/702,979 for Tracking Battery Conditions filed May 4, 2015 (Young et al.); 70 pages.

U.S. Appl. No. 29/529,441 for Indicia Reading Device filed Jun. 8, 2015 (Zhou et al.); 14 pages.

U.S. Appl. No. 14/747,490 for Dual-Projector Three-Dimensional Scanner filed Jun. 23, 2015 (Jovanovski et al.); 40 pages.

U.S. Appl. No. 14/740,320 for Tactile Switch for a Mobile Electronic Device filed Jun. 16, 2015 (Bamdringa); 38 pages.

U.S. Appl. No. 14/740,373 for Calibrating a Volume Dimensioner filed Jun. 16, 2015 (Ackley et al.); 63 pages.

\* cited by examiner

POWER REPORTS IN WIRELESS SCANNER SYSTEMS

CROSS-REFERENCE TO RELATED APPLICATION

The present application claims the benefit of Chinese Patent Application for Utility Model No. 201520129333.4 for Power Reports in Wireless Scanner Systems filed Mar. 6, 2015 at the State Intellectual Property Office of the People's Republic of China. The foregoing patent application is hereby incorporated by reference in its entirety.

FIELD

The present invention relates generally to data communication. More particularly, example embodiments of the present disclosure relate to data communications related to power levels in wireless scanner systems.

BACKGROUND

Generally speaking, wireless scanners operate at radio frequencies (RF) and are thus also called "RF scanners." RF scanners are operable for accessing information and transmitting corresponding data for processing. In addition to data access and transmission operability, RF scanners have become familiar in commercial, consumer, logistic, industrial, civil and other uses, at least in part, because they free users from constraints of wireline scanners, which are connected by cables and related interfaces.

Typical wireless scanning systems combine a portable or mobile wireless scanner with a radio base station. Data gathered by the wireless scanner is typically transmitted to the wireless base station. Upon receiving the transmitted data, the base station typically relays the data to a computer for registration and other processing. Typically, the radio base station is supplied with operating power directly from the computer or from another readily available power source associated therewith or proximate thereto.

For all practical purposes related to the present disclosure, the readily available power supply associated with the radio base station need not be considered as a "finite" source of power. On the contrary, power therefrom is typically available to the radio base station on-demand and/or as-needed. Unlike the radio base station and its readily available local power however, the mobile wireless scanner is typically supplied with power by an on-board battery.

On one hand, battery power promotes portability characteristics associated with the mobile wireless scanner. On another hand however, battery power sources are indeed finite, relative to the essentially non-finite sources available readily to the base station. The wireless scanner consumes power continuously as it is operated. The amount of power remaining available from the battery thus diminishes continuously, more or less, over time as it is consumed by the scanner.

As the battery power is consumed, the battery approaches an ultimate low power level. Below the ultimate low power level, the wireless scanner may fail to operate properly in one or more significant aspects (or at all) and thus, become operationally unavailable, at least until the battery is recharged or exchanged with a battery having a fresh charge. Unavailability of operational scanners, battery chargers and/or fresh batteries may be expected to have adverse effects on overall reliability.

To deter unexpected power deficiencies and concomitant system reliability issues, features have been added to existing RF scanners for monitoring the power level (and perhaps related electrical conditions) of their batteries. For example, Bluetooth RF scanners operate over the ISM (Instrumentation, Scientific and Medical) RF band around 2.4 Gigahertz (GHz) and incorporate a firmware feature operable for monitoring, displaying and reporting information relating to their battery levels.

The battery level monitoring, displaying and reporting feature may present a visual and/or audible indication on a display or indicator feature of the RF scanner. Responsive to the monitoring feature detecting an approach of the battery to a low operability level, the visual/audible indication is presented on the display/indicator and/or reported to the base station. Users of the scanner and/or the computer associated with the base station may thus be alerted in relation to the low battery power level.

Developments related to operability, connectivity, mobility and availability of mobile computing and communication devices ("mobile devices") such as "smart phones," tablet computers, portable data terminals (PDTs), personal digital assistants (PDAs) and the like have increased their usefulness over a variety of scenarios and situations. For example, RF scanners are used increasingly with mobile devices, sometimes and perhaps increasingly in lieu of the base stations.

For example, mobile device users may connect a mobile device for use directly with an RF scanner. Such usage is typically performed at a point of use of the scanner. An information source such as a credit card or a coupon may be scanned, for example, at a point of sale. The RF scanner accesses the scanned information and transmits a corresponding data signal to a receptive mobile device, which may process the received data directly and/or transmit a corresponding data signal to another computer for processing.

The RF scanner monitors its own battery condition and sends corresponding power level data to the mobile device, which may relay the data to the other computer. The mobile device (and/or the other computer) may present a corresponding alert. However, the mobile devices may be used with the scanners in which the work thus performed and corresponding remuneration due may be typically tracked, registered and evaluated by achievement metrics related to volume, speed, throughput, and/or progress.

While the mobile devices also typically monitor the level of their own batteries, the presentation of their own power level condition may be somewhat subdued or minimal, relative to the alert they present corresponding to the diminished power level of the associated scanners. And unfortunately, the high volume/speed/throughput situations in which they are used together may sometimes become frantic, fast-paced and confusing and the less pronounced mobile device power level indicators may thus be overlooked.

Therefore, a need exists for monitoring and reporting the battery power level of the RF scanners and additionally, the battery power level of mobile devices with which the RF scanners may be used. A need also exists for reporting the battery power levels of both the RF scanners, and the mobile devices used therewith, by presenting corresponding power level information to users of the mobile devices in a format likely to alert the users readily in relation to the power state of the mobile device.

Further, a need exists to deter system unreliability issues caused by unexpected unavailability of the mobile devices due to sudden insufficiency of the battery power levels thereof using existing computing resources and without adding significant complexity thereto.

Issues and approaches discussed within this background section may, but not necessarily have, been conceived or pursued previously. Unless otherwise indicated to the contrary, it thus should not be assumed that anything discussed in this background section corresponds to any alleged prior art merely by inclusion in this discussion.

SUMMARY

Accordingly, in one aspect, an embodiment of the present invention embraces a method for monitoring and reporting the battery power level of a mobile device used with an RF scanner. An example embodiment reports the battery power level of the mobile device by presenting a corresponding alert for users of the RF scanner.

Power level information is presented for a mobile device used with a scanner for processing information scanned therewith. The mobile device is polled from the RF scanner, in relation to a power level present in a battery source thereof. Responsive to the polling, checked power level data is reported to the scanner, processed and evaluated. Upon the evaluation detecting that the mobile device battery power level is low, presentation of a corresponding alert is commanded. The alert is presented on an indicator of the RF scanner. Data corresponding to the alert may also be presented at the mobile device and a remote computer.

Example embodiments thus deter system unreliability issues, which may otherwise result from an unexpected unavailability of the mobile device due to sudden insufficiency of the battery power level thereof.

In an example embodiment, the monitoring and reporting of the battery power level of the mobile device is performed using existing computing resources and without adding significant complexity thereto. For example, the monitoring and reporting of the mobile device battery power level may be implemented, at least in part, using resources with which the RF scanner monitors and reports its own battery power level.

An example embodiment relates to a method for reporting the battery power level of a mobile device used with an RF scanner. The method comprises, at least in part, polling the mobile device for information relating to a power level present in its battery power source, processing a response to the polling from the mobile device, and based on the processing of the response, commanding a presentation a corresponding alert on an indicator of the RF scanner.

The mobile device may also be commanded to present the corresponding alert. For example, information representing the alert may be rendered graphically on a display component of the mobile device. In an example embodiment, the RF scanner is operable for performing the polling of the mobile device and processing the response thereto. The RF scanner is also operable for performing the commanding or instructing of the mobile device based on the processing of the response.

Another example embodiment relates to a computer readable storage medium. The computer readable storage medium is non-transitory, and comprises instructions for causing a processor component of a computer to perform the method for reporting the battery power level of a mobile device used with an RF scanner, which is referred to above.

Yet another example embodiment relates to a system for scanning potential information sources. The system comprises an RF scanner and a mobile device used therewith. The system may also comprise another computer, which may be used with the mobile device. The RF scanner is operable for examining the potential sources to detect information which may be availably present therewith, accessing the detected information, and transmitting a corresponding data signal to the mobile device.

In an example embodiment, the polling of the mobile device, processing the response thereto, and/or commanding the presentation of the corresponding alert may be implemented, at least in part, using a feature of the RF scanner such as firmware. The alert may also be sent to the mobile device and/or the other computer for presentation.

In another aspect, an example embodiment of the present invention embraces a system operable for monitoring and reporting information related to the power level present in a power source of a scanner component and for monitoring and reporting information related to the power level present in a power source of a mobile device used with the scanner component. An example embodiment is implemented in which the scanner component is operable for the monitoring and the reporting of the information related to the power level present in the power source of the mobile device used therewith.

Information is presented related to a power level of a mobile device used with a scanner for processing information scanned therewith. The mobile device is polled from the RF scanner, in relation to a power level present in a battery source providing power to the mobile device. The power level present in the battery source providing power to the mobile device is checked.

Responsive to the polling, data relating to the checked power level present in the battery source providing power to the mobile device is reported to the scanner. The reported data relating to the checked power level present in the battery source providing power to the mobile device are processed by the scanner. The scanner evaluates the processed data in relation to the power level present in the battery source providing power to the mobile device.

Upon the evaluation detecting that the processed data indicate that the power level present in the battery source providing power to the mobile device is at or below a low power set point, a presentation of a corresponding alert relating to the detected low power level present in the battery providing power to the mobile device is commanded. The corresponding alert relating to the detected low power level present in the battery providing power to the mobile device is presented on an indicator component of the RF scanner. The command may also be sent to the mobile device and the corresponding alert presented at an indicator thereof. For example, a representation of the alert may be rendered graphically on a display of the mobile device.

The foregoing illustrative summary, as well as other features of example embodiments of the present invention, and the manner in which the same are accomplished, are further explained within the more somewhat more detailed description of the specification following below and the figures of its accompanying drawings.

DETAILED DESCRIPTION OF EXAMPLE EMBODIMENTS

Figure 1:
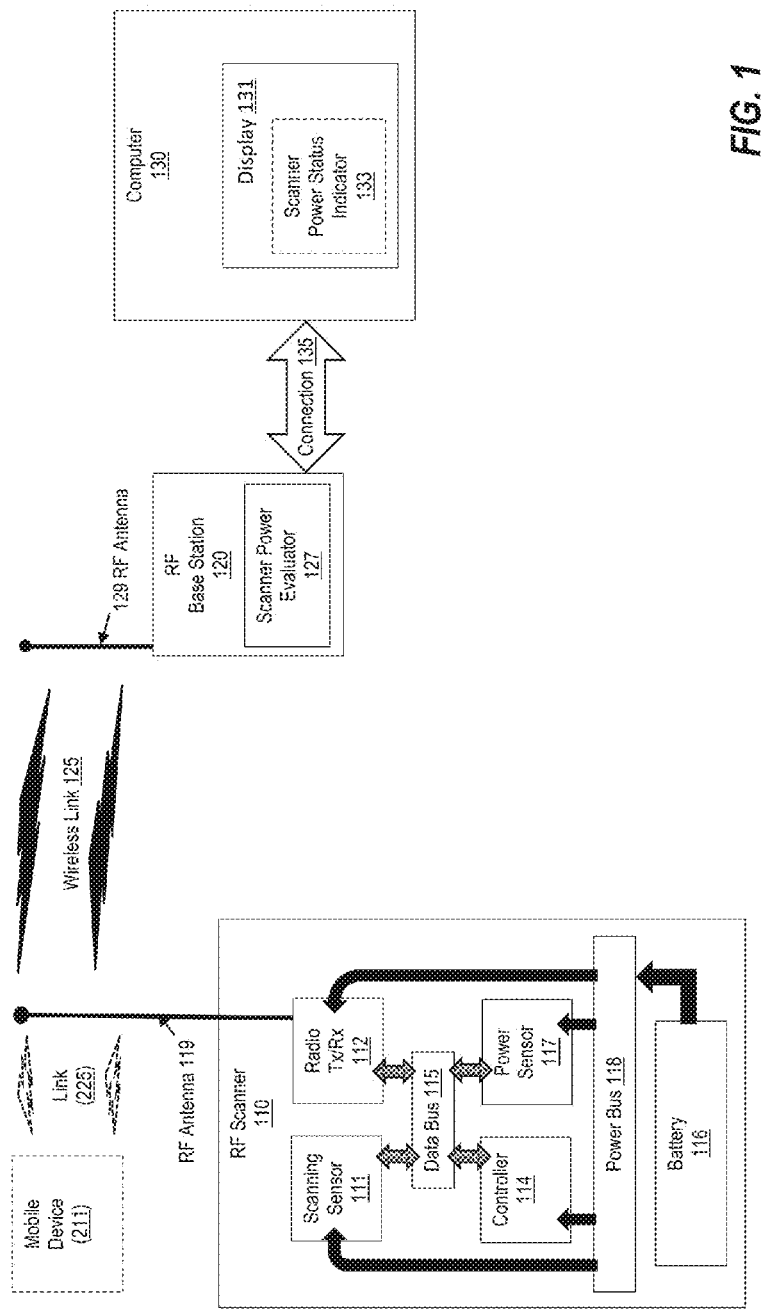
FIG. 1 depicts an RF scanning system, with which an embodiment of the present invention may be applied.

Embodiments of the present invention are described in relation to reporting the battery power level of a mobile device used with an RF scanner. The RF scanner is operable for polling the mobile device for information relating to a power level present in its battery power source, processing a response to the polling from the mobile device, and based on the processing of the response, commanding presentation of a corresponding alert, which is presented on a visual and/or audible indicator component of the RF scanner.

The command may also be sent in a message to the mobile device, which is thus instructed implement the presentation of the information on an indicator thereof. For example, a representation of the alert may be rendered graphically on a display of the mobile device.

In an example embodiment, the monitoring and reporting of the battery power level of the mobile device is performed using existing computing resources and without adding significant complexity thereto. For example, an embodiment implements the monitoring and reporting of the mobile device battery power level, at least in part, using resources with which the RF scanner monitors and reports its own battery power level.

An example embodiment relates to a method for reporting the battery power level of a mobile device used with an RF scanner. The method comprises, at least in part, polling the mobile device for information relating to a power level present in its battery power source, processing a response to the polling from the mobile device, and based on the processing of the response, commanding the presentation of a corresponding alert. The RF scanner presents the alert with an indicator component.

The command may also be sent to the mobile device, which may present the corresponding alert with an indicator associated with the mobile device. The mobile device may render information representing the alert graphically on a display associated therewith (and/or with an audible signal). The RF scanner is operable for performing the polling of the mobile device, processing data sent in response to the polling, evaluating the processed data, commanding a presentation of corresponding alerts and presenting the alert on a local indicator.

The RF scanner is also operable for sending command messages to the mobile device. The command messages may thus instruct the mobile device to present the corresponding alerts, as well.

Information is presented related to a power level of a mobile device used with a scanner for processing information scanned therewith. The mobile device is polled from the RF scanner, in relation to a power level present in a battery source providing power to the mobile device.

The power level present in the battery source providing power to the mobile device is checked. Responsive to the polling, data relating to the checked power level present in the battery source providing power to the mobile device are reported to the scanner.

The reported data relating to the checked power level present in the battery source providing power to the mobile device are processed by the scanner and evaluated. Upon the evaluation detecting that the processed data indicate that the power level present in the battery source providing power to the mobile device is at or below a low power set point, the scanner commands presentation of a corresponding alert.

The scanner presents the alert on an indicator component thereof. The scanner may also send the command in a message to the mobile device, which may thus be instructed to also present the alert.

In contrast with example embodiments, and in so far as they may consider mobile devices for use with the RF scanners at all, conventional approaches typically rely on whatever features the mobile devices may have to monitor and report on their own battery power levels. This is because conventional scanner systems are typically designed around RF scanners used with more or less fixed radio base stations and in contrast to example embodiments, thus focus on monitoring and reporting a power level present in a battery of the RF scanner.

FIG. 1 depicts an RF scanning system 100, with which an embodiment of the present invention may be applied. An RF scanner 110 is communicatively coupled, by a wireless link 125, with an RF base station 120. The wireless link 125 supports a bidirectional exchange of data signals between the RF scanner 110 and the RF base station 120. The base station 120 is coupled, by a connection 125, with a computer 130. The connection 125 supports a bidirectional exchange of data signals between the RF base station 120 and the computer 130.

The connection 125 also supports a supply of power to the RF base station 120 from the computer 130. The RF scanner 110 is powered by a battery 116, which allows scanner 110 to be readily portable and mobile. Power from the batter 116 is supplied to other components of scanner 110 via a power bus 118. A power sensor component 117 is operable for sensing a power level of the battery 116, periodically or continuously, by sensing a voltage level present on the power bus 118 during operation of RF scanner 110.

The power sensor 117 outputs a signal representing the power level of the battery 118 over a data bus 115 with a controller component 114. The controller 114 may comprise a microprocessor, a microcontroller, or other programmable logic device. Controller 114 is operable for receiving input data signals from other components of RF scanner 110 via data bus 115.

The controller 114 is operable for processing the received input data, and sending output command and other control signals (which may correspond responsively to the processed data), via data bus 115.

RF scanner 110 also comprises a scanning sensor component 111 and a radio transceiver ("transmitter and receiver," abbreviated 'Tx/Rx') component 112. The scanning sensor 111 is operable for scanning a potential source of information outside the RF scanner 110 and within a corresponding range of sensitivity.

As used herein, "scanning" relates to examining the potential information source for any information that may be present therewith, accessing the information therefrom if present, and reporting data related thereto. The scanning sensor 111 may thus send a signal corresponding to the scan rated data to the controller 114 via the data bus 115.

The controller 114 is operable for processing the reported data signal received, via the data bus 115, from the scanning sensor 111 in relation to the scanning (and/or the controller 114) and outputting a corresponding data signal, via the data bus 115 to the RF transceiver 112. The transceiver 112 is operable modulating and transmitting a corresponding output signal from the scanner 110, over the RF link 125.

The RF base station 120 receives the transmitted signals from the scanner 110 over an antenna 129 and may transmit a corresponding acknowledgement signal to indicate registration of the scan. The base station 120 may also report the registration of the scan data, via the connection 135, back to the scanner 110.

The transceiver 112 is also operable for receiving, over an antenna 119, an input radio signal. The input signal may comprise a message sent, via the wireless link 125, from the base station 120. The input may also comprise a signal from another radio source to which the RF scanner 110 is sensitive). The transceiver 112 is further operable for demodulating the received signal and sending a data signal corresponding to the demodulated signal, via the data bus 115, to the controller 114.

The controller 114 is operable for processing the input radio, and dispatching, via data bus 115, corresponding (and other) output data signals for modulation and transmission from the radio transceiver 112. The output signal sent over the wireless link 125 by the RF scanner 110 may thus comprise evaluation and command signals corresponding to the processed battery power level data input from the power sensor 117.

For example, the controller 114 is operable for processing the input data received from the power sensor component in relation to the present on the battery 117.

As the power level in the battery is depleted over a duration of operation of the RF scanner 110, it may approach a low level setting. The approach to the low level set point may be detected by the power sensor 117 as a corresponding voltage level present on the power bus 118 diminishes.

Upon detecting the battery voltage reaching the low voltage setting, the power sensor 117 sends a corresponding data signal to the controller 114.

The controller 114 processes the power related data signal and outputs a corresponding command, via the data bus 115, to the RF transceiver 112. Upon receiving the command, the RF transceiver 112 is operable for modulating and transmitting the corresponding power related data wirelessly over the link 125.

The RF base station 120 receives the data signal sent over the wireless link 125 by the RF scanner 110 through an RF antenna 129. The received signals include the base station 120 comprises a scanner power evaluating feature 127. The scanner power evaluator feature 127 is operable for evaluating the available power level present in the battery of the scanner 110 based on the evaluation and command signals corresponding to the processed battery power level data. The base station 120 may annunciate and/or report an alert based on the evaluated signals.

For example, the base station 120 may report the alert, via the connection 135, to the computer 130. The computer 130 may render a corresponding scanner power status alert indication 133 graphically on an associated display 131. The base station 120 and/or the computer 130 may also annunciate the alert audibly and/or visually by triggering associated tones, lights or other alert or alarm indicators.

Example embodiments of the present disclosure relate to the incorporation of mobile computer and communication devices (referred to herein as "mobile devices") as components in wireless scanning systems such as may be represented by scanning system 100. Mobile devices include portable data terminals (PDTs), "smart phones" (e.g., "Android™," "iPhone™" platforms or the like), tablet and similar computers (e.g., "Chromebook™," "iPad™" platforms or the like), portable digital assistants (PDAs), laptop computers, etc.

An example embodiment of the present disclosure may be implemented in which the RF scanner 110 interacts with a mobile device (e.g., mobile device 211 via link 225, which are described below with reference to one or more of FIG. 2A through FIG. 5, inclusive). The mobile device (211) is operable for exchanging data directly with the RF scanner 110. In an example embodiment, the mobile device (211) is thus operable for augmenting or replacing one or more functions otherwise handled by the base station 120.

Figure 2A:
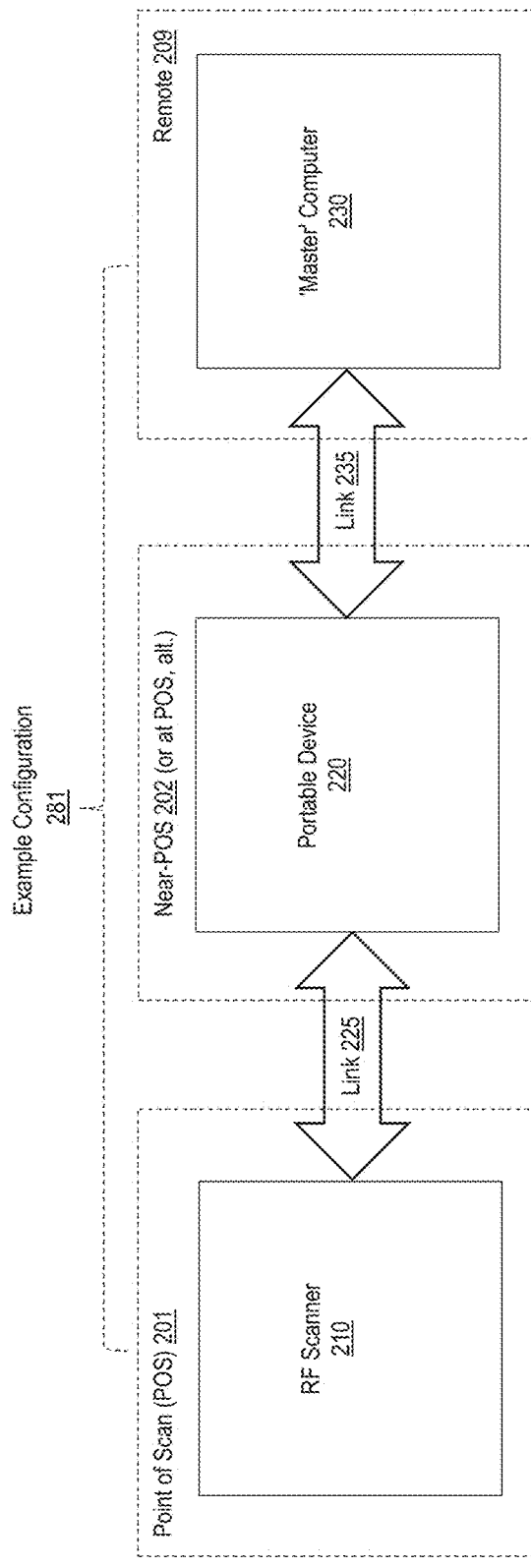
FIG. 2A depicts an example scanning system, showing a graphical representation of a first example configuration thereof, according to an embodiment of the present invention.

FIG. 2A depicts an example scanning system 200, showing a graphical representation of a first example configuration thereof 281, according to an embodiment of the present invention. The example scanning system 200 may comprise one or more features similar to those described above (e.g., in relation to the scanner system 100; FIG. 1).

The scanning system 200 comprises an RF scanner 210, which is used at a point of scanning (POS) 201, such as a point of sale in an example commercial use scenario. The scanning system 200 also comprises a mobile device 220, which is communicatively coupled with the RF scanner 220 for an exchange of data signals via a link 225.

The link 225 may comprise a wireless communication link, which may be operable at radio and/or optical (e.g., infrared) wavelengths. In the first configuration 281, the mobile device 220 may be used at the point of scanning 201, or at a location 202 near, proximate, to the POS 201.

The scanning system 200 may also comprise a "master" or "central" computer, which is communicatively coupled with the mobile device 210 for an exchange of data signals via a link 235. The link 235 may comprise a wireless radio links, as well as a wireline connection. The computer 230 may be used at a location 209, which is disposed remotely from the point of scanning 201 (e.g., relative to the near-POS location 202).

Figure 2B:
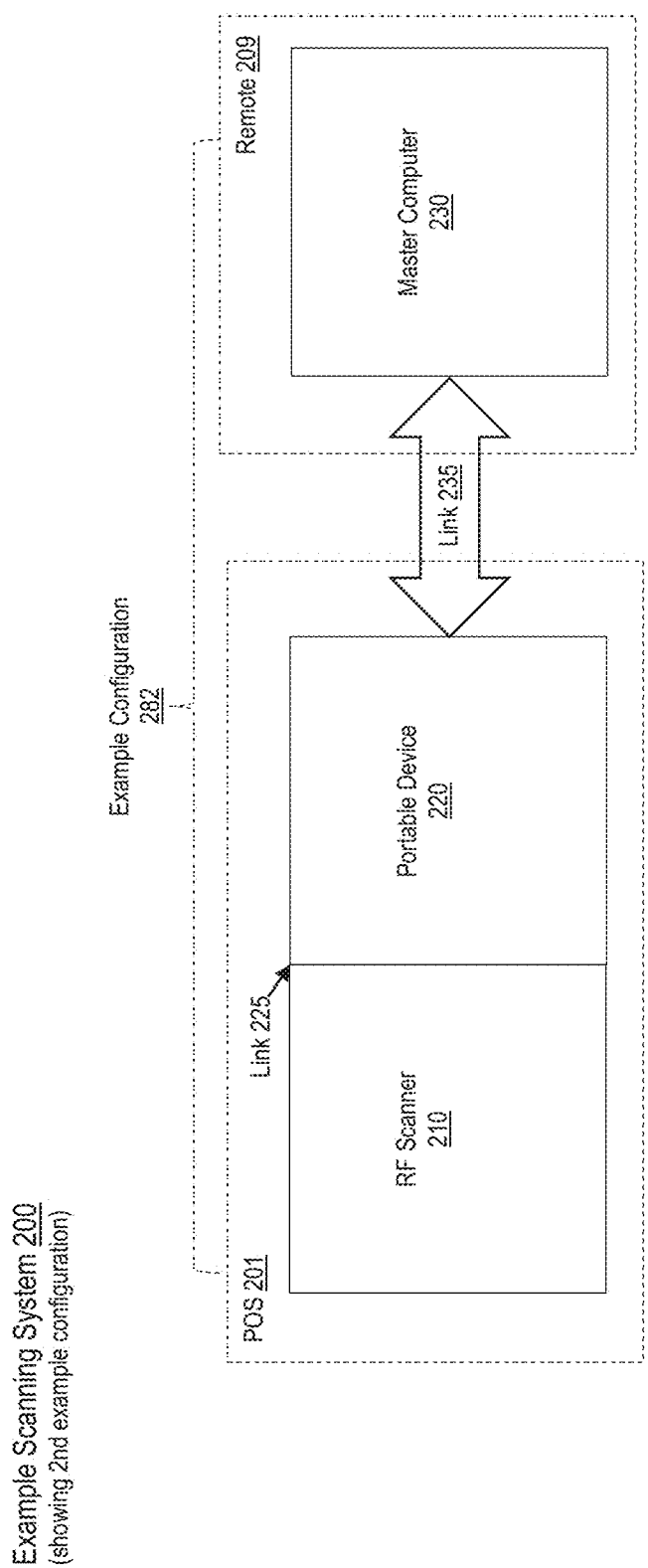
FIG. 2B depicts the scanning system, showing a graphical representation of a second example configuration thereof, according to an embodiment.

FIG. 2B depicts the scanning system 200, showing a graphical representation of a second example configuration 282 thereof, according to an embodiment. In the second configuration 282, both the RF scanner 210 and the mobile device 220 are used together at the point of scan 201.

An example embodiment may be implemented in which the scanner 210 and the mobile device 220 are coupled together electromechanically. The link 225 may thus comprise an electrical connection, which becomes operably actuated, for exchanging data signals between them, upon mechanically coupling the scanner 210 and the mobile device 220 together in a physically attachment.

In the second example configuration 282, the computer 230 remains communicatively coupled with the mobile device 210 for an exchange of data signals via the link 235 and at the remote location 209.

Figure 3A:
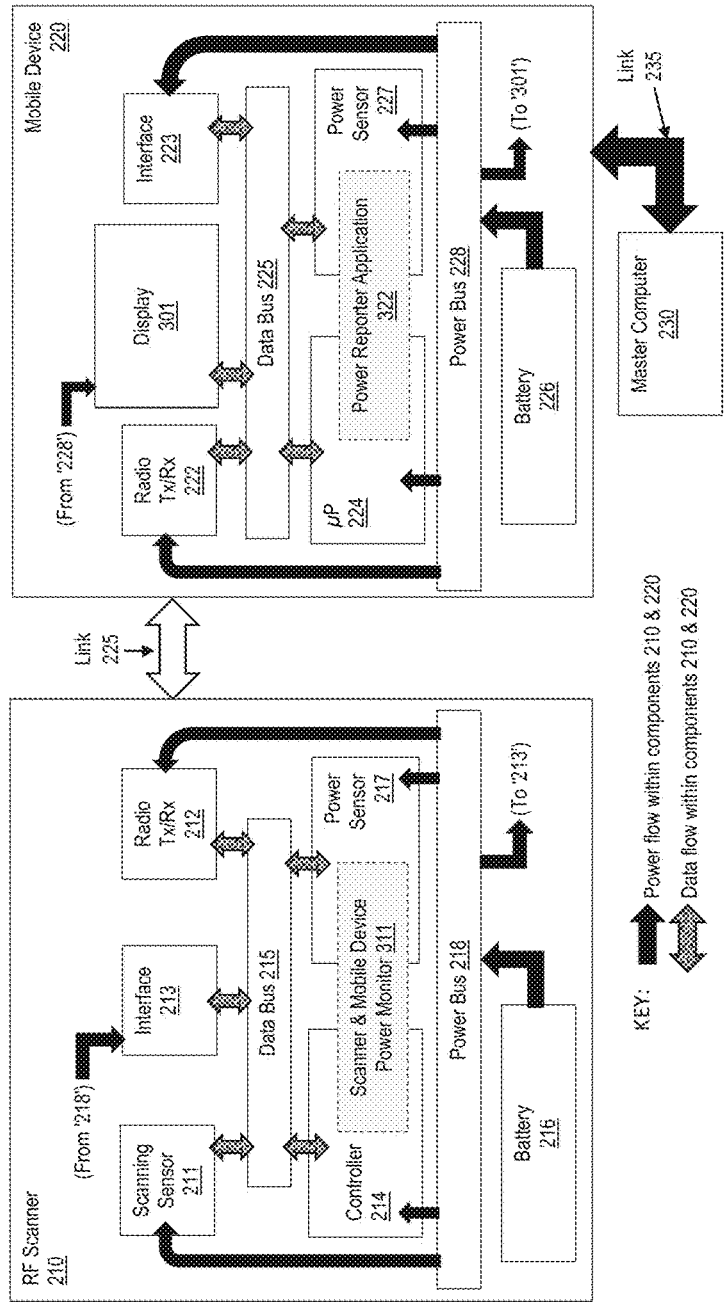
FIG. 3A depicts the scanning system, showing schematic representations of some example components thereof, according to an embodiment.

FIG. 3A depicts the scanning system 200, showing schematic representations of some example components thereof, according to an embodiment. Mobile device 220 is communicatively coupled, by the link 225 (which may also comprise an interface 223), with the RF scanner 210. The link 225 (and interface 223) support bidirectional exchanges of data signals between the mobile device 220 and the RF scanner 210.

The mobile device 220 is coupled, by a link 235, with a computer 230. The connection 235 supports a bidirectional exchange of data signals between the mobile device 220 and the master computer 230.

The mobile device 220 is powered by an on-board battery 226. The mobile device comprises a power sensor component 227, which is operable for sensing a power level of the battery 226, periodically or continuously, by sensing a voltage level present on the power bus 228 during operation of the mobile device 220. The power sensor 227 outputs a signal representing the power level of the battery 226 over a data bus 225 to a controlling microprocessor component 224.

The microprocessor 224 is operable for receiving input data signals from other components of the mobile device 220 via the data bus 225. The microprocessor 224 is operable for processing the received input data, and sending output command and other control signals (which may correspond responsively to the processed data), via data bus 225.

Moreover, an example embodiment may be implemented in which the mobile device comprises a power reporter application 322. The power reporter application 322 is operable and disposed over the power sensor 227 and/or over the microprocessor 224.

The mobile device 220 also comprises a display component 301. The display 301 is operable for rendering graphical information corresponding to data signals received from the microprocessor 224. For example, the display 301 is operable for rendering graphical information corresponding to data signals received from the RF scanner 210 in relation to scanning operations performed therewith, the power level present in its battery 216 and as described below, the power level present in its own battery 226.

The mobile device 220 receives the signals transmitted from the RF scanner 210 via the transceiver 222 and/or the interface 223, and may transmit thereto a corresponding acknowledgement signal to indicate registration of scans performed therewith. The mobile device 220 may also report the registration of the scan data, via the link 235, to the master computer 230. The master computer 230 may comprise a cash register in a commercial use example, which may be used in a central location (e.g., 209), more or less remote from the point of scan (e.g., 201).

The transceiver 222 is operable for receiving an input radio signal. The input signal may comprise a message sent, via the link 225, from the RF scanner 210 in relation to scans performed therewith, the power level present in the battery 216 of the RF scanner 210 and in its own battery 226. Messages related to the power levels present in the battery 216 of the scanner 210 and the mobile device 220 may also be sent via the interface 223.

The input signal may also comprise a signal from another radio source to which the mobile device 220 is sensitive. The transceiver 222 is further operable for demodulating the received signal and sending a corresponding data signal, via the data bus 225, to the microprocessor 224.

The microprocessor 224 is operable for processing the input radio signal and dispatching, via data bus 225, corresponding (and other) output data signals for modulation and transmission from the radio transceiver 222. The output signal sent over the link 225 by the mobile device 220 may thus comprise evaluation and command signals corresponding to the processed battery power level data input from the power sensor 227.

For example, the microprocessor 224 is operable for processing the input data received from the power sensor component 227 in relation to the present on the battery 226. As the power level in the battery 226 is depleted over a duration of operation of the mobile device it may approach a low level setting, which may be detected by the power sensor 227 as a correspondingly low voltage level present on the power bus 228.

Upon detecting the battery voltage reaching the low voltage setting, the power sensor 227 sends a corresponding data signal to the microprocessor 224. An example embodiment may be implemented in which these actions are supported, at least in part, by an operation power reporter application 322.

The microprocessor 224 processes the power related data signal and outputs a corresponding command and/or other control signal, via the data bus 225, to the RF transceiver 222. Upon receiving the command/control signal, the RF transceiver 222 is operable for modulating and transmitting the corresponding power related data wirelessly over the link 225 and the link 235.

The RF scanner 210 and the computer 230 receive the data signal sent by the microprocessor 220 over the link 225 and the link 235, respectively. The base station 220 comprises a scanner power evaluating feature 227. The scanner power evaluator feature 227 is operable for evaluating the available power level present in the battery of the scanner 210 based on the evaluation and command signals corresponding to the processed battery power level data.

The RF scanner 210 is communicatively coupled with the mobile device 220 by the link 225 for the bidirectional exchange of data signals therewith. The RF scanner 210 comprises a power sensor component 217 operable for sensing a power level of its own on-board battery component 216, periodically or continuously, by sensing a voltage level present on the power bus 218 during operation of RF scanner 210.

The power sensor 217 outputs a signal representing the power level of the battery 216 over a data bus 215 to a controller component 214. The controller 214 may comprise a microprocessor, a microcontroller, or other programmable logic device. Controller 214 is operable for receiving input data signals from other components of RF scanner 210 via the data bus 215, processing the received input data, and sending output command and other control signals (which may correspond responsively to the processed data), via the data bus 215.

Importantly, an example embodiment may be implemented in which the RF scanner 210 also comprises a 'scanner and mobile device power monitor' component 311 disposed in firmware and/or stored tangibly as an application with a non-transitory computer readable storage medium.

The 'scanner and mobile device power monitor' firmware/application 311 is disposed, at least partially, over one or more of the power sensor 217 or the controller 214. The 'scanner/mobile device power monitor' 311 is operable with the power monitor 317 and/or the controller 214 for monitoring the present battery 216 power level, for itself.

Importantly, an example embodiment may be implemented in which the 'scanner/mobile device power monitor' 311 is also operable with the power monitor 317 and/or the controller 214 for monitoring the present battery 226 power level for the mobile device 220, as well. For example, a data signal corresponding to a low level alert related to the battery 226 and transmitted, via the link 225, to the RF scanner 210.

In an example embodiment, the 'scanner/mobile device power monitor' 311 is operable with the controller 214 to send a command to the mobile device 220, via the link 225. The command relates to polling the mobile device 220 in relation the present power level of its batter 226. The polling command may activate a corresponding interaction, using data signals exchanged via the link 225, between the 'scanner/mobile device power monitor' 311 of the RF scanner 211 and the 'power reporter application' 322 of the mobile device 320.

In response to the polling command (and corresponding activated 'scanner/mobile device power monitor' 311/ 'power reporter application' 322 cooperation), the power sensor 227 checks the present power level of the battery 226. If the present power level of the batter 226 is below its low level set point, then the 'power reporter application' 322 operates to cause the mobile device 220 to send a corresponding low power level report in relation to the battery 226 to the RF scanner 210 and the master computer 230.

Figure 3B:
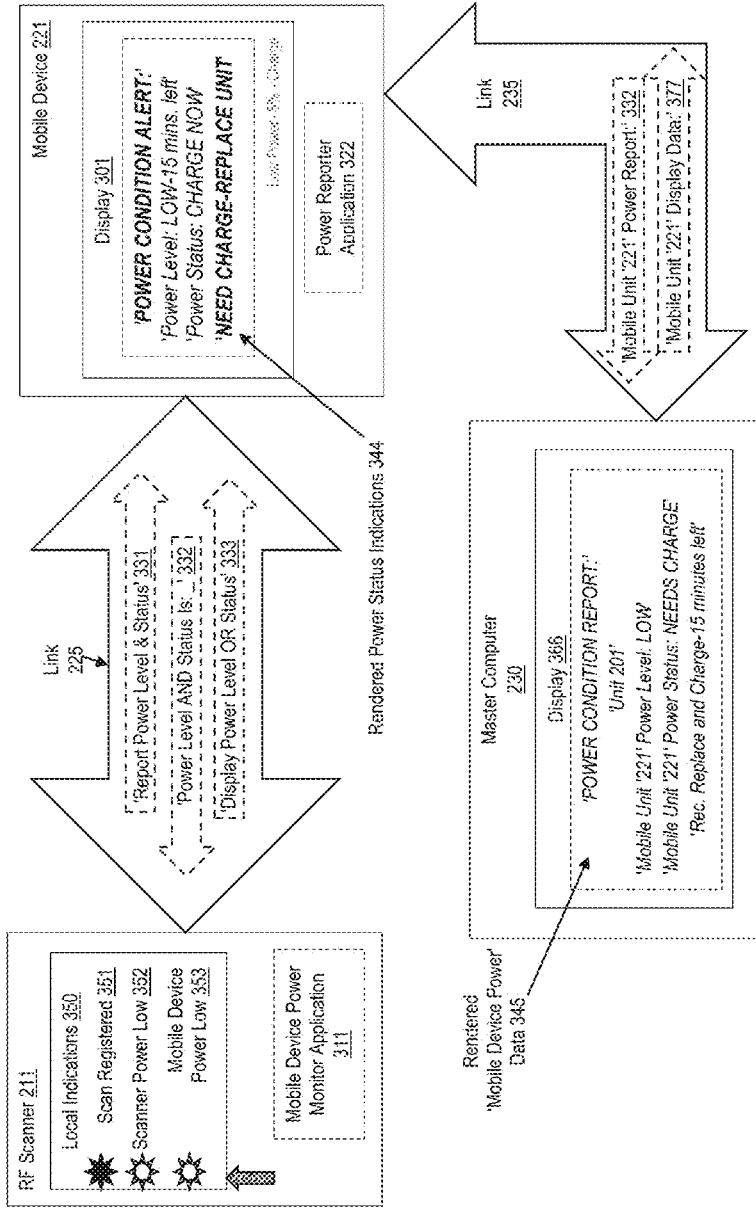
FIG. 3B depicts the scanning system, showing a representation of example data flow between components thereof, according to an embodiment.

Upon receiving the battery 226 low power level report from the mobile device 220, the 'scanner/mobile device power monitor' 311 may cause the RF scanner 210 to command a presentation of a corresponding 'mobile device "220" battery "226" power level low' alert. The RF scanner 210 may present the commanded alert with an indicator component (353; FIG. 3B).

The RF scanner 210 may also send a command relating to presentation of the alert corresponding to the 'mobile device "220" battery "226" power level low' alert (333; FIG. 3B) to the mobile device 220. Responsive to the command, the mobile device may present the alert with a local indicator thereof. For example, the mobile device 220 may render a representation of information related to the alert on the display 301.

Upon receiving the 'present alert' command, the mobile device 220 renders a corresponding 'alert' indication 344 (FIG. 3B) on its display 301. In an example embodiment, the display 301 mobile device 220 renders the alert indication 344 in addition to, and notwithstanding, any other power related data presented by the mobile device 221.

The computer 230 may also present an alert indication (366; FIG. 3B) corresponding to the low power report or the 'present alert' command, which may be relayed (e.g., message 332; FIG. 3B) to the computer 230 by the mobile device 220.

The RF scanner 210 also comprises a scanning sensor component 211 and a radio transceiver (Tx/Rx) component 212. The scanning sensor 211 is operable for scanning a potential source of information outside the RF scanner 210 and within a corresponding range of sensitivity.

The controller 214 is further operable for processing the reported data signal received, via the data bus 215, from the scanning sensor 211 in relation to the scanning and outputting a corresponding data signal, via the data bus 215 to the RF transceiver 212. The transceiver 212 is operable modulating and transmitting a corresponding output signal from the scanner 210, over the RF link 225.

The mobile device 220 receives the transmitted signals from the RF scanner 210 and may transmit thereto a corresponding acknowledgement signal to indicate registration of the scan. The base station 220 may also report the registration of the scan data, via the connection 235, to the master computer 230. The master computer 230 may comprise a cash register in a commercial use example, which may be used in a central location (e.g., 209), more or less remote from the point of scan (e.g., 201).

The transceiver 212 is also operable for receiving an input radio signal. The input signal may comprise a message sent, via the link 225, from the mobile device 220. The input may also comprise a signal from another radio source to which the RF scanner 210 is sensitive. The transceiver 212 is further operable for demodulating the received signal and sending a corresponding data signal, via the data bus 215, to the controller 214.

The controller 214 is operable for processing the input radio signal and dispatching, via data bus 215, corresponding (and other) output data signals for modulation and transmission from the radio transceiver 212. The output signal sent over the link 225 by the RF scanner 210 may thus comprise evaluation and command signals corresponding to the processed battery power level data input from the power sensor 217.

For example, the controller 214 is operable for processing the input data received from the power sensor component in relation to the present on the battery 217. As the power level in the battery is depleted over a duration of operation of the RF scanner 210 it may approach a low level setting, which may be detected by the power sensor 217 as a correspondingly low voltage level present on the power bus 218. Upon detecting the battery voltage reaching the low voltage setting, the power sensor 217 sends a corresponding data signal to the controller 214.

The controller 214 processes the power related data signal and outputs a corresponding command and/or other control signal, via the data bus 215, to the RF transceiver 212. Upon receiving the command/control signal, the RF transceiver 212 is operable for modulating and transmitting the corresponding power related data wirelessly over the link 225.

FIG. 3B depicts the scanning system, showing a representation of example data flow between components thereof according to an embodiment. The mobile device power monitor 311 causes the RF scanner 211 to poll the mobile device 220 in relation to the power level present on its battery by sending a data signal thereto via the link 225, the data signal comprising a 'report power level and status' message 331 to the mobile device 221.

The RF scanner 210 comprises a panel of local indicators 350. The local indicators 350 may each comprise a light emitting diode (LED) or another indicator with similar small form factor, low power use, and/or simplicity (e.g., of circuitry with which it is wired and/or processing used for modulating its actuation). For example, the local indicators 350 comprise an LED 351, which is operable for presenting a 'scan registered' indication locally to a user of the scanner 210.

The LED 351 may present the local 'scan registered' indication at a first color (e.g., green) and/or by blinking a given number of times (e.g., once or twice) at a flash rate readily perceivable by the user upon a successful registration of a particular scan. A corresponding audible tone (e.g., "beeps") may be associated with actuation of the 'scan registration' indication 351.

The local indicators 350 also comprise an LED 352, which is operable for presenting a 'local scanner power low' indication locally to a user of the scanner 210.

The LED 352 may present the local 'local scanner power low' indication at a second color (e.g., red) and continuously, while a local low power condition persists at the scanner 210 related to a low power level present in its own on-board battery 216. A corresponding solid or other audible tone may be associated with actuation of the 'local scanner power low' indication 352.

Responsive to receiving the 'report power level and status' message 331, the power reporter application 322 causes the mobile device 320 to check the present power level of its battery 326. The power reporter application 322 causes the mobile device 320 to send a message 332 reporting the power level and status of its battery 226 to the RF scanner 210.

Upon receiving, processing and evaluating data related to a power level and status report 332, to the effect that the present mobile device 220 battery 226 power level has reached or decreased below a low level set point, the mobile device power monitor 311 generates a corresponding alert. The RF scanner 310 presents the alert responsively with the mobile device power low indicator 353.

The RF scanner 210 may also command the mobile device 220 to present the corresponding alert by sending a message 333 thereto, over the link 225. The message 333 commands the mobile device 221 to display its power level or status.

Upon receiving the display power level or status command 333, the power reporter application 322 causes the mobile device 221 to render a power status indication 344 on its display 301. The power status indication 344 is rendered on the display 301 in addition to, and notwithstanding, any other power level indications presented by the mobile device 220 on it or any other indicator.

Further, upon receiving the display power level or status command 333, the power reporter application 322 causes the mobile device 221 to send a corresponding 'power report' message 332 to the master computer 230, via the link 235. Upon receiving the power report 332, the computer 230 may render data 345 related to the power level and status of the mobile device 220 on an associated display 366 associated therewith Upon receiving the power report 332, the computer 230 is also operable for sending a 'display power data' command 377 to the mobile device 320. The power reporter application 322 may cause the mobile device 320 to render the power alert indicator 344 based on the display power data command 377, which may thus augment or back up the display power level or status command 333 thereto from the RF scanner 210.

Importantly, the local indicators 350 also comprise an LED 353, which is operable for presenting a 'mobile device power low' indication locally to a user of the scanner 210. The LED 353 may actuate its illumination upon receipt of the 'power level and status is Low' message 332.

The LED 353 may present the local 'mobile device power low' indication at the second color (e.g., red) and continuously, while a low power condition persists at the mobile device 220 related to a low power level present in its on-board battery 226. A corresponding solid, warbling or other audible tone may be associated with actuation of the 'mobile device power low' indication 353.

Referring again to FIG. 3A, the RF scanner 210 also comprises the scanning sensor 211, which is operable for scanning a potential source of information outside the RF scanner 210 and within a corresponding range of sensitivity. Again, as described above, "scanning" refers herein to examining the potential information source for any information that may be present therewith, accessing the information therefrom if present, and reporting a corresponding data signal to the controller 214 via the data bus 215.

The scanner 211 is operable for scanning potential information sources. The scanner 211 is thus operable for examining one or more potential sources, which comprise non-transitory storage media readable therewith. The scanner 211 is operable for reading the media, to which the scanner 211 is sensitive physically, and for accessing the information that may thus be detected. The RF scanner 210 may send a scan related data signal to the mobile device 220 via the link 225. Upon receiving an acknowledgement to receiving the scan related data, the scanner 210 may actuate the 'scan registered' indicator 351.

Figure 4:
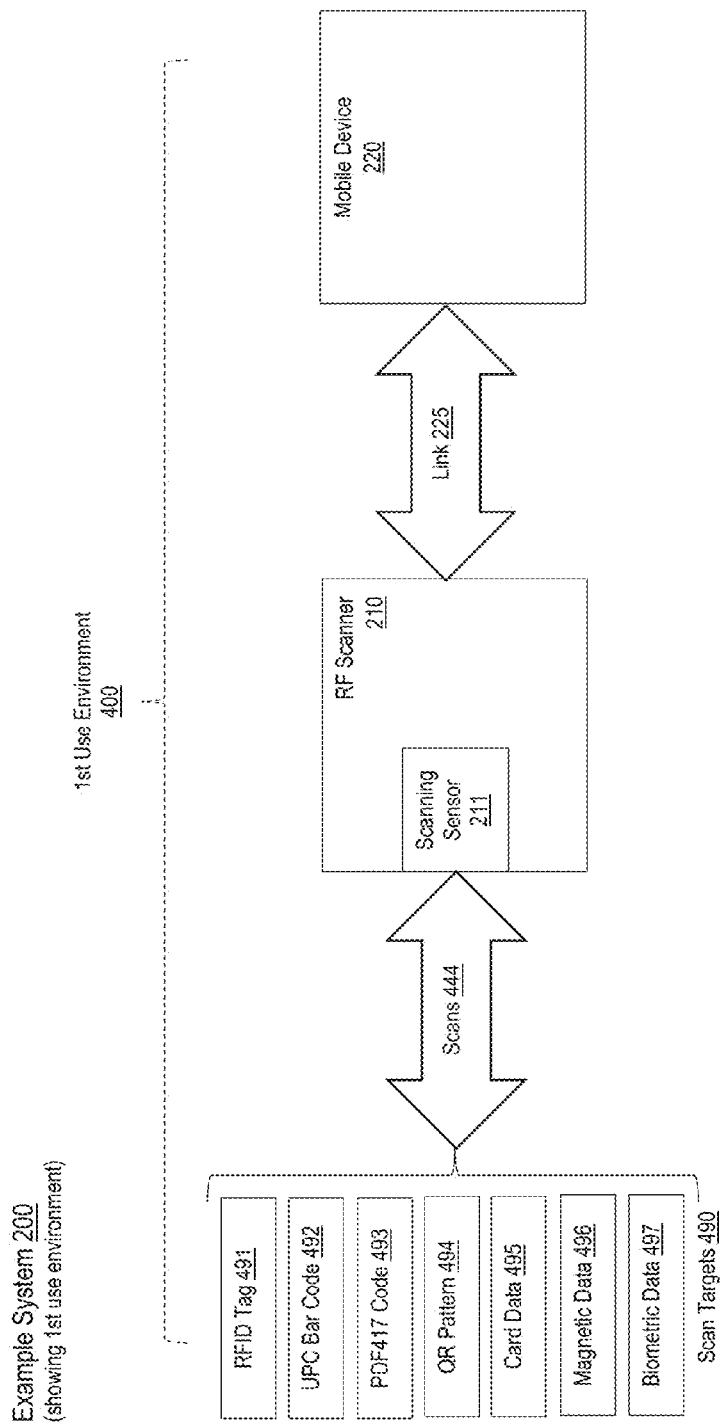
FIG. 4 depicts the scanning system, showing a representation of a first example use environment, according to an embodiment.

FIG. 4 depicts the scanning system 200, showing a representation of a first example use environment 400, according to an embodiment. In the first example use environment 400, the RF scanner 210 is sensitive to one or more of the array of scan targets 490 and, upon detecting information stored therewith, registering a corresponding scan 444 with the RF scanner 210. The scanner 210 may register the scan with the mobile device 220, via the link 225.

The scan targets 490 each comprise a non-transitory medium operable for storing information in a tangible form, each of which is unique in relation to the others. The RF scanner 210 is sensitive, with its scanning component 211, to one or more of the scan targets 490. For example, the scan target 491 comprises a Radio Frequency Identification Device (RFID) tag.

Bar codes and other code patterns store information accessibly in relation to data presented in two dimensional (2D) geometric code patterns, such as bar codes. Bar codes may comprise 2D geometries of various complexities. For example, Universal Product Code (UPC) patterns are relatively simple. More complex bar codes comprise 2D matrix arrays, such as quick read (QR) matrices.

Other more complex patters may encode various file formats, such as a portable document file (PDF). For example, PDF related data may be encoded in a PDF417 array. PDF417 arrays comprise four vertical bars and spaces and a horizontal length. The length of the PDF417 is disposed over 17 linear horizontal units. The term "PDF417" thus abbreviates a description of this graphic design relationship.

The scan target 492 comprises a UPC bar code. The scan target 493 comprises a PDF417 code pattern. The scan target 494 comprises a QR pattern array. The scan target 495 comprises a card such as an access card, a debit or credit card, an identity or security card, or the like. The scan target 496 comprises a magnetic medium such as a magnetic strip. The scan target 497 comprises biometric media. These examples are presented by way of illustration (not limitation) and the scan targets 490 may include other media readily.

Figure 5:
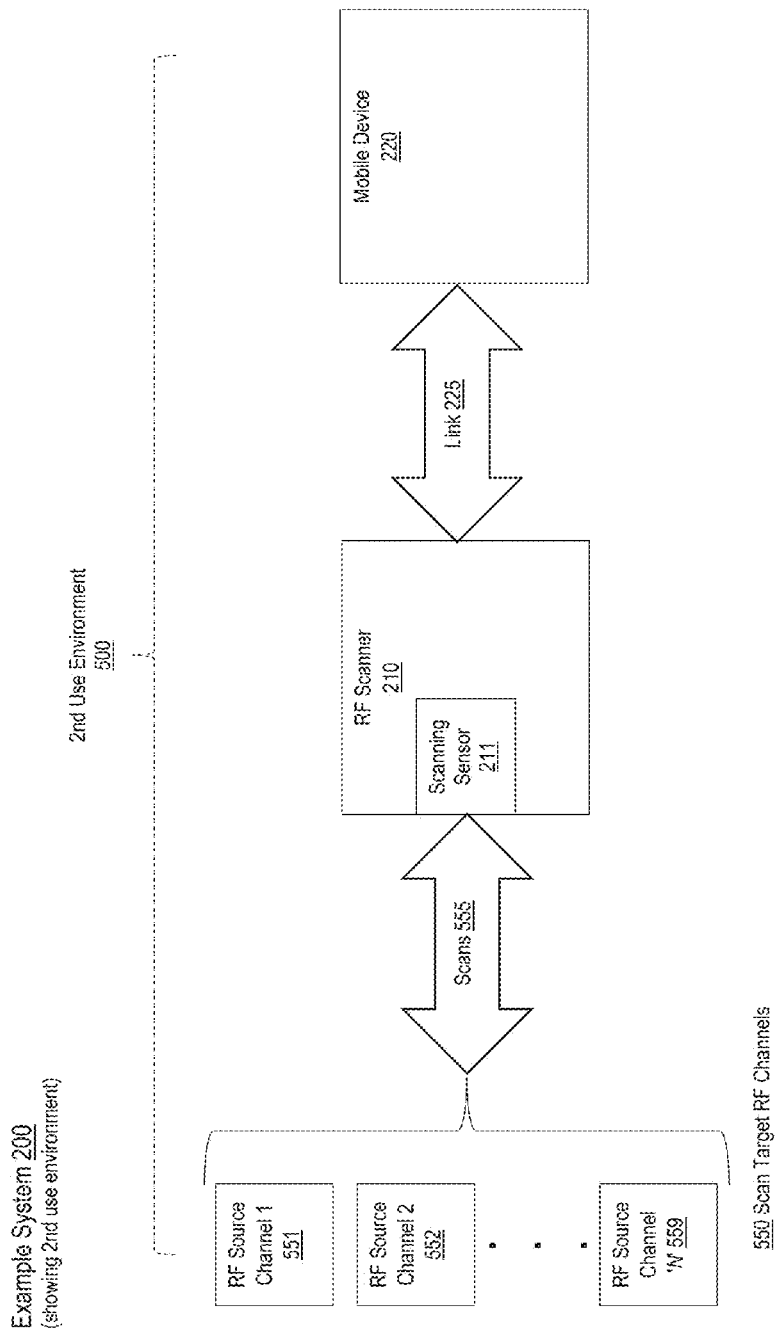
FIG. 5 depicts the scanning system, showing a representation of a second example use environment, according to an embodiment.

FIG. 5 depicts the scanning system 200 to represent a second example use environment 500, according to an embodiment. In the second example use environment 500, the RF scanner 210 is sensitive to detecting transmissions over an RF spectrum from any of the scan targets 550. The scan targets 550 comprise a plurality of potential radio sources, 551, 552, . . . , 559, inclusive, each corresponding respectively to channels 1, 2, . . . , through N, inclusive, in which N comprises a numerical integer greater than two (2).

Each of the channels 1-N may be associated with radio signals transmitted over a given frequency, which may be unique relative to the operating frequency of the other channels. The RF scanner 210 may perform sans 555 over each of the potential RF sources 551-559 continuously (or periodically) and/or sequentially. Upon detecting an active radio signal transmitted from one of the potential sources, the RF scanner 210 tunes in lockably, or "locks on," to the radio transmission from the active source.

Upon losing the radio signal from the tuned-in channel, the RF scanner 210 releases the locked-in tuning thereto continues actively performing scans 555 over all of the channels 1-N, inclusive.

An example embodiment thus relates to a scanning system, which comprises a mobile device. The mobile device comprises an on-board battery power source and a component operable for sensing a power level present in the battery.

The scanner system also comprises an RF scanner coupled over a communicative link with the mobile device. The RF scanner is and operable for scanning a potential source of information, accessing corresponding scan data upon detecting the information, modulating the accessed scan data and transmitting a scan data signal to the mobile device. The mobile device is operable for processing the transmitted scan data upon receipt.

The RF scanner is further operable for polling the mobile device in relation to the sensed power level present in the battery power source thereof. Responsive to the polling, the mobile device is further operable for reporting to the RF scanner data relating to the sensed power level present in the battery source providing its power.

The RF scanner is further operable for:

processing the reported data relating to the sensed power level present in the battery source providing power to the mobile device;

evaluating the processed data reported in relation to the power level present in the battery source providing power to the mobile device;

commanding a presentation, upon the evaluation detecting that the processed data indicate that the power level present in the battery source providing power to the mobile device is at or below a low power set point. The commanded presentation relates to a corresponding alert relating to the detected low power level present in the battery providing power to the mobile device; and presenting the corresponding alert relating to the detected low power level present in the mobile device battery on an indicator component (353; FIG. 3B).

Further still, the RF scanner may be operable for commanding the presentation of the corresponding alert remotely. For example, the corresponding mobile device battery low power level alert may be presented on an indicator disposed locally in relation to the mobile device, such as a display associated and co-located with the mobile device. The remote presentation of the alert may thus comprise rendering a representation of the processed data on the mobile device display.

The system may also comprise a computer (e.g., master or central computer) component communicatively coupled with the mobile device. The corresponding alert may also thus be presented with an indicator associated locally relative to the computer component. For example, data corresponding to the mobile device battery low power level alert may thus be represented and rendered on a display component associated and co-located with the computer.

The sensing of the power level present in the battery source providing power to the mobile device may be performed discretely in response to the polling, as well as continuously and/or periodically.

Figure 6:
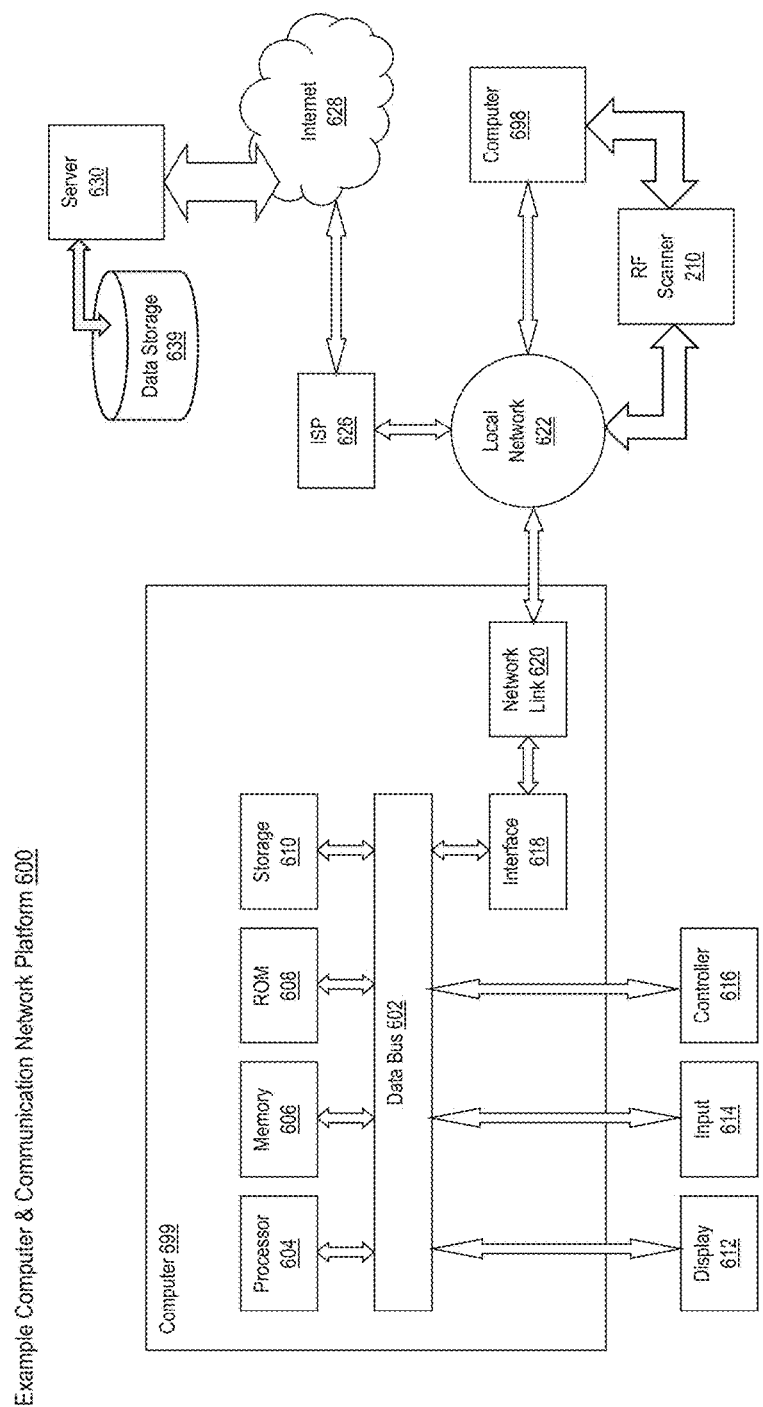
FIG. 6 depicts an example computer and communication network platform with which an embodiment may be implemented.

FIG. 6 depicts an example computer and communication network platform 600, with which an embodiment may be implemented. For example, the computer 230, the mobile device 220 and/or the RF scanner may each comprise a computer and/or exchange data via networks, which may be represented at least in relation to some aspects thereof with reference to FIG. 6. For example, the mobile device 220, the RF scanner 210 and/or the master computer 230 may be represented by reference to at least one of the computer 699, the computer 698 or the server 630 shown in FIG. 6.

The example computer and communication network platform 600 is operable for performing or supporting a process in which power level information is presented for a mobile device used with a scanner for processing information scanned therewith. The mobile device is polled from the RF scanner, in relation to a power level present in a battery source thereof. Responsive to the polling, checked power level data is reported to the scanner, processed and evaluated. Upon the evaluation detecting that the mobile device battery power level is low, presentation of a corresponding alert is commanded. The alert is presented on an indicator of the RF scanner. Data corresponding to the alert may also be presented at the mobile device and a remote computer The computer 699 comprises a data bus 602 or other communication mechanism for communicating information, and a processor 604 coupled with bus 602 for processing information. Computer 699 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604.

Computer 699 further includes a read only memory (ROM) 608 or other static storage device coupled to bus 602 for storing static information and instructions for processor 604. A storage device 610, such as a magnetic disk, an optical disk, and/or flash storage, is provided and coupled to bus 602 for storing information and instructions. Processor 604 may perform one or more digital signal processing (DSP) functions. Additionally or alternatively, DSP functions may be performed by another processor (such as a GPU or "graphics processing unit") or entity, also represented herein with reference to processor 604.

Computer 699 may be coupled via bus 602 to a display 612, such as a modern liquid crystal display (LCD), older cathode ray tube (CRT) types, plasma displays, "thin" (or "cold cathode") CRTs, or the like, for displaying information to a computer user. In some implementations (e.g., some PDTs, phones, tablets and PDAs), LCDs (or even thin CRTs) may be used with some regularity.

An input device 614, including alphanumeric (and/or other) symbols and other keys, is coupled to bus 602 for communicating information and command selections to processor 604. Another type of user input device is cursor control 616, such as haptic-enabled "touch-screen" or "mouse pad" GUI displays or a mouse, a trackball, or cursor direction keys for communicating direction information and command selections to processor 604 and for controlling cursor movement on display 612.

Such input devices typically have two degrees of freedom in two (2) axes, a first axis (e.g., x) and a second axis (e.g., y), which allows the device to specify positions in a plane. Some phones with simpler keyboards may implement this or a similar feature haptically using a touch-screen GUI display and/or with a set of directionally active "arrow" keys.

Embodiments of the present disclosure relate to the use of computer 699 for presenting power level information for a mobile device, which is used with an RF scanner for processing information scanned therewith. The mobile device is polled from the RF scanner, in relation to a power level present in a battery source thereof. Responsive to the polling, checked power level data is reported to the scanner, processed and evaluated. Upon the evaluation detecting that the mobile device battery power level is low, presentation of a corresponding alert is commanded. The alert is presented on an indicator of the RF scanner. Data corresponding to the alert may also be presented at the mobile device and a remote computer. This feature is provided, controlled, enabled or allowed with computer 699 functioning in response to processor 604 executing one or more sequences of one or more instructions comprising or contained in main memory 606.

Such instructions may be read into main memory 606 from another computer-readable medium, such as storage device 610. Execution of the sequences of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the invention. Thus, embodiments of the invention are not limited to any specific combination of hardware, circuitry, firmware and/or software.

The terms "computer-readable medium" and/or "computer-readable storage medium" as used herein may refer to any non-transitory storage medium that participates in providing instructions to processor 604 for execution. Such a medium may take many forms, including but not limited to, non-volatile media, volatile media, and transmission media. Non-volatile media includes, for example, optical or magnetic disks, such as storage device 610.

Volatile media includes dynamic memory, such as main memory 606. Transmission media includes coaxial cables, copper wire and other conductors and fiber optics, including the wires (or other conductors or optics) that comprise bus 602. Transmission media can also take the form of acoustic (e.g., sound) or electromagnetic (e.g., light) waves, such as those generated during radio wave and infrared and other optical data communications.

Common or familiar forms of non-transitory computer-readable storage media include, for example, a floppy disk, a flexible disk, hard disk, magnetic tape, or any other magnetic medium, a CD-ROM, any other optical medium, punch cards, paper tape, any other legacy or other physical medium with patterns of holes, a RAM, a PROM, and EPROM, a FLASH-EPROM, any other memory chip or cartridge, a carrier wave as described hereinafter, or any other medium from which a computer can read.

Various forms of non-transitory computer readable storage media may be involved in carrying one or more sequences of one or more instructions to processor 604 for execution. For example, the instructions may initially be carried on a magnetic disk of a remote computer (e.g., server 630). The remote computer can load the instructions into its dynamic memory and send the instructions over a telephone line and/or network, e.g., using a modem ("modulator/demodulator").

A modem local to the computer 699 can receive the data over networks wirelessly and/or on wireline (e.g., coaxial cable, fiber optics, telephone lines, etc.) and use an infrared or other transmitter to convert the data to an infrared or other signal. An infrared or other detector coupled to bus 602 can receive the data carried in the infrared or other signal and place the data on bus 602. Bus 602 carries the data to main memory 606, from which processor 604 retrieves and executes the instructions. The instructions received by main memory 606 may optionally be stored on storage device 610 either before or after execution by processor 604.

Computer 699 also includes a communication interface 618 coupled to bus 602. Communication interface 618 provides a two-way data communication coupling to a network link 620 that is connected to a local network 622. For example, communication interface 618 may comprise a cable modem or a DSL (digital subscription line), or legacy media such as ISDN (integrated services digital network) cards, or other modem types to provide a data communication connection to a corresponding type of telephone line or wireless medium. As another example, communication interface 618 may comprise a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) (or telephone switching company) 626. In an embodiment, local network 622 may comprise a communication medium with which a user's telephone functions.

ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer 22, are exemplary forms of carrier waves transporting the information.

Computer 699 can send messages and receive data, including program code, through the network(s), network link 620 and communication interface 618. For example, computer 699 (representing the mobile device 220) communicates with the computer 698 (representing the RF scanner 210).

In the Internet example, a server 630 might register scans and low battery power conditions related to the mobile device 220 and the RF scanner 210 through Internet 628, ISP 626, local network 622 and communication interface 618. The server 630 may register the scans 444 and 555 with a database or other data storage modality 639. The server 630 may also query the database 639 to access data relevant to the scans therefrom. In an embodiment of the invention, the computers 698 and 699 may downloaded data from the server 630. The downloaded data may relate to monitoring and reporting the power levels present in on-board batteries associated with the mobile device 220 and/or the RF scanner 210.

The received code may be executed by processor 604 as it is received, and/or stored in storage device 610, or other non-volatile storage for later execution. In this manner, computer 22 may obtain application code in the form of a carrier wave. An example embodiment may be implemented in which computer 699 gathers data from the database 639, the server 630, and/or the computer 698 via the local network 622 and the network link 620, or via the internet

628. An example embodiment may also be implemented in which the computer 699 gathers data from the database 639 by means of queries directed via the server 630 and over the internet (or other network) 628, as well as the local network 622 and network link 620, etc.

Figure 7:
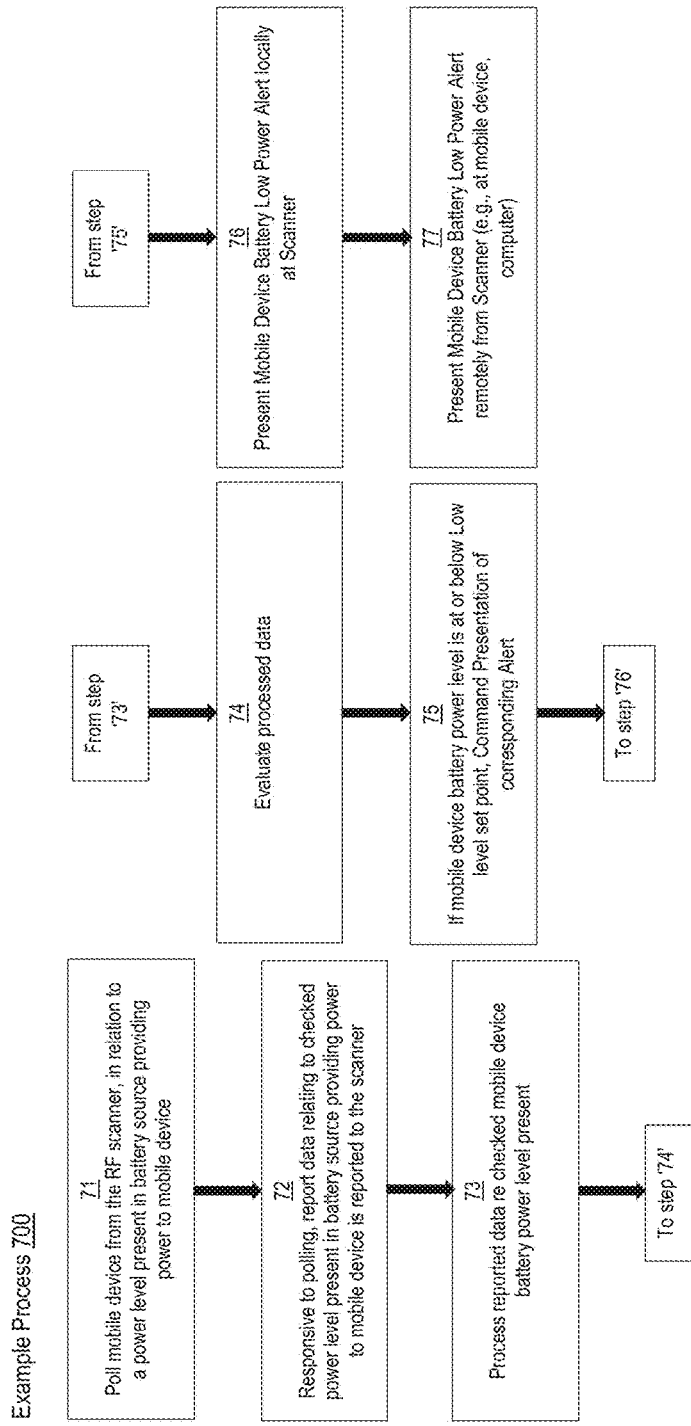
FIG. 7 depicts a flowchart representing an example process, according to an embodiment.

FIG. 7 depicts a flowchart representing an example process 70, according to an embodiment. Process 70 relates to presenting information is presented related to a power level of a mobile device used with a scanner for processing information scanned therewith.

In step 71, the mobile device is polled from the RF scanner, in relation to a power level present in a battery source providing power to the mobile device. The power level present in the battery source providing power to the mobile device is checked, The checking of the power level present in the battery source providing power to the mobile device may be checked discretely, in response to the polling. Additionally and/or alternatively, the checking of the power level present in the battery source providing power to the mobile device may be checked. The continuous and/or the periodic checking may be performed notwithstanding the polling.

Responsive to the polling, data relating to the checked power level present in the battery source providing power to the mobile device is reported to the scanner in step 72.

In step 73, the reported data relating to the checked power level present in the battery source providing power to the mobile device are processed.

In step 74, the processed data reported in relation to the power level present in the battery source providing power to the mobile device are evaluated.

Upon the evaluation detecting that the processed data indicate that the power level present in the battery source providing power to the mobile device is at or below a low power set point, a presentation of a corresponding alert relating to the detected low power level present in the battery providing power to the mobile device is commanded in step 75.

In step 76, the corresponding alert relating to the detected low power level present in the battery providing power to the mobile device is presented on an indicator disposed locally in relation to the RF scanner.

In step 77, the presentation of the corresponding alert relating to the detected low power level present in the battery providing power to the mobile device; and commanding.

The presentation of the corresponding alert relating to the detected low power level present in the battery providing power to the mobile device on an indicator disposed remotely in relation to the RF scanner may comprise presenting the corresponding alert, relating to the detected low power level present in the battery providing power to the mobile device, with an indicator disposed locally in relation to the mobile device.

The presentation of the corresponding alert with an indicator disposed locally in relation to the mobile device may comprise rendering a representation of the processed data locally with a display component associated with the mobile device.

The presentation of the corresponding alert may also comprise presenting the corresponding alert with an indicator disposed locally in relation to a computer used with the mobile device and the RF scanner. The presentation of the corresponding alert may comprise rendering a representation of the processed data with a display component associated with the computer.

The polling of the mobile device, from the RF scanner, in relation to the power level present in a battery source providing power to the mobile device, may comprise transmitting a corresponding message from the RF scanner to the mobile device.

The checking of the power level present in the battery source providing power to the mobile device may be performed discretely in response to the polling. The checking of the power level present in the battery source providing power to the mobile device may also be performed continuously and/or periodically.

The commanding of the presentation of the corresponding alert relating to the detected low power level present in the battery providing power to the mobile device may comprise transmitting a corresponding message from the RF scanner to the mobile device.

The commanding of the presentation of the corresponding alert relating to the detected low power level present in the battery providing power to the mobile device may also comprise transmitting a corresponding message from one or more of the RF scanner or the mobile device to a computer used therewith.

An example embodiment may be implemented in which the method 70 is performed by a processor executing instructions. The instructions may be stored tangibly as a non-transitory computer readable storage medium comprising instructions. The instructions are operable for causing or programming a computer processor to perform a method for presenting information related to a power level of a mobile device used with a RF scanner for processing information scanned therewith.

Example embodiments are thus described in relation to power reports in wireless scanner systems. An example embodiment has been described in relation to presenting power level information for a mobile device used with a scanner for processing information scanned therewith. The mobile device is polled from the RF scanner, in relation to a power level present in a battery source thereof. Responsive to the polling, checked power level data is reported to the scanner, processed and evaluated. Upon the evaluation detecting that the mobile device battery power level is low, presentation of a corresponding alert is commanded. The alert is presented on an indicator of the RF scanner. Data corresponding to the alert may also be presented at the mobile device and a remote computer.

To supplement the present disclosure, this application incorporates entirely by reference the following commonly assigned patents, patent application publications, and patent applications:

U.S. Pat. No. 6,832,725; U.S. Pat. No. 7,128,266;
U.S. Pat. No. 7,159,783; U.S. Pat. No. 7,413,127;
U.S. Pat. No. 7,726,575; U.S. Pat. No. 8,294,969;
U.S. Pat. No. 8,317,105; U.S. Pat. No. 8,322,622;
U.S. Pat. No. 8,366,005; U.S. Pat. No. 8,371,507;
U.S. Pat. No. 8,376,233; U.S. Pat. No. 8,381,979;
U.S. Pat. No. 8,390,909; U.S. Pat. No. 8,408,464;
U.S. Pat. No. 8,408,468; U.S. Pat. No. 8,408,469;
U.S. Pat. No. 8,424,768; U.S. Pat. No. 8,448,863;
U.S. Pat. No. 8,457,013; U.S. Pat. No. 8,459,557;
U.S. Pat. No. 8,469,272; U.S. Pat. No. 8,474,712;
U.S. Pat. No. 8,479,992; U.S. Pat. No. 8,490,877;
U.S. Pat. No. 8,517,271; U.S. Pat. No. 8,523,076;
U.S. Pat. No. 8,528,818; U.S. Pat. No. 8,544,737;
U.S. Pat. No. 8,548,242; U.S. Pat. No. 8,548,420;
U.S. Pat. No. 8,550,335; U.S. Pat. No. 8,550,354;
U.S. Pat. No. 8,550,357; U.S. Pat. No. 8,556,174;
U.S. Pat. No. 8,556,176; U.S. Pat. No. 8,556,177;
U.S. Pat. No. 8,559,767; U.S. Pat. No. 8,599,957;
U.S. Pat. No. 8,561,895; U.S. Pat. No. 8,561,903;

U.S. Pat. No. 8,561,905; U.S. Pat. No. 8,565,107;
U.S. Pat. No. 8,571,307; U.S. Pat. No. 8,579,200;
U.S. Pat. No. 8,583,924; U.S. Pat. No. 8,584,945;
U.S. Pat. No. 8,587,595; U.S. Pat. No. 8,587,697;
U.S. Pat. No. 8,588,869; U.S. Pat. No. 8,590,789;
U.S. Pat. No. 8,596,539; U.S. Pat. No. 8,596,542;
U.S. Pat. No. 8,596,543; U.S. Pat. No. 8,599,271;
U.S. Pat. No. 8,599,957; U.S. Pat. No. 8,600,158;
U.S. Pat. No. 8,600,167; U.S. Pat. No. 8,602,309;
U.S. Pat. No. 8,608,053; U.S. Pat. No. 8,608,071;
U.S. Pat. No. 8,611,309; U.S. Pat. No. 8,615,487;
U.S. Pat. No. 8,616,454; U.S. Pat. No. 8,621,123;
U.S. Pat. No. 8,622,303; U.S. Pat. No. 8,628,013;
U.S. Pat. No. 8,628,015; U.S. Pat. No. 8,628,016;
U.S. Pat. No. 8,629,926; U.S. Pat. No. 8,630,491;
U.S. Pat. No. 8,635,309; U.S. Pat. No. 8,636,200;
U.S. Pat. No. 8,636,212; U.S. Pat. No. 8,636,215;
U.S. Pat. No. 8,636,224; U.S. Pat. No. 8,638,806;
U.S. Pat. No. 8,640,958; U.S. Pat. No. 8,640,960;
U.S. Pat. No. 8,643,717; U.S. Pat. No. 8,646,692;
U.S. Pat. No. 8,646,694; U.S. Pat. No. 8,657,200;
U.S. Pat. No. 8,659,397; U.S. Pat. No. 8,668,149;
U.S. Pat. No. 8,678,285; U.S. Pat. No. 8,678,286;
U.S. Pat. No. 8,682,077; U.S. Pat. No. 8,687,282;
U.S. Pat. No. 8,692,927; U.S. Pat. No. 8,695,880;
U.S. Pat. No. 8,698,949; U.S. Pat. No. 8,717,494;
U.S. Pat. No. 8,717,494; U.S. Pat. No. 8,720,783;
U.S. Pat. No. 8,723,804; U.S. Pat. No. 8,723,904;
U.S. Pat. No. 8,727,223; U.S. Pat. No. D702,237;
U.S. Pat. No. 8,740,082; U.S. Pat. No. 8,740,085;
U.S. Pat. No. 8,746,563; U.S. Pat. No. 8,750,445;
U.S. Pat. No. 8,752,766; U.S. Pat. No. 8,756,059;
U.S. Pat. No. 8,757,495; U.S. Pat. No. 8,760,563;
U.S. Pat. No. 8,763,909; U.S. Pat. No. 8,777,108;
U.S. Pat. No. 8,777,109; U.S. Pat. No. 8,779,898;
U.S. Pat. No. 8,781,520; U.S. Pat. No. 8,783,573;
U.S. Pat. No. 8,789,757; U.S. Pat. No. 8,789,758;
U.S. Pat. No. 8,789,759; U.S. Pat. No. 8,794,520;
U.S. Pat. No. 8,794,522; U.S. Pat. No. 8,794,526;
U.S. Pat. No. 8,798,367; U.S. Pat. No. 8,807,431;
U.S. Pat. No. 8,807,432; U.S. Pat. No. 8,820,630;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2011/0202554;
U.S. Patent Application Publication No. 2012/0111946;
U.S. Patent Application Publication No. 2012/0138685;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0056285;
U.S. Patent Application Publication No. 2013/0070322;
U.S. Patent Application Publication No. 2013/0075168;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0200158;
U.S. Patent Application Publication No. 2013/0256418;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0278425;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306730;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0341399;
U.S. Patent Application Publication No. 2013/0342717;
U.S. Patent Application Publication No. 2014/0001267;
U.S. Patent Application Publication No. 2014/0002828;
U.S. Patent Application Publication No. 2014/0008430;
U.S. Patent Application Publication No. 2014/0008439;
U.S. Patent Application Publication No. 2014/0025584;
U.S. Patent Application Publication No. 2014/0027518;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061305;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0075846;
U.S. Patent Application Publication No. 2014/0076974;
U.S. Patent Application Publication No. 2014/0078341;
U.S. Patent Application Publication No. 2014/0078342;
U.S. Patent Application Publication No. 2014/0078345;
U.S. Patent Application Publication No. 2014/0084068;
U.S. Patent Application Publication No. 2014/0097249;
U.S. Patent Application Publication No. 2014/0098792;
U.S. Patent Application Publication No. 2014/0100774;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0108682;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;

U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0160329;
U.S. Patent Application Publication No. 2014/0166755;
U.S. Patent Application Publication No. 2014/0166757;
U.S. Patent Application Publication No. 2014/0166759;
U.S. Patent Application Publication No. 2014/0166760;
U.S. Patent Application Publication No. 2014/0166761;
U.S. Patent Application Publication No. 2014/0168787;
U.S. Patent Application Publication No. 2014/0175165;
U.S. Patent Application Publication No. 2014/0175169;
U.S. Patent Application Publication No. 2014/0175172;
U.S. Patent Application Publication No. 2014/0175174;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0203087;
U.S. Patent Application Publication No. 2014/0204268;
U.S. Patent Application Publication No. 2014/0214631;
U.S. Patent Application Publication No. 2014/0217166;
U.S. Patent Application Publication No. 2014/0217180;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/436,337 for an Electronic Device, filed Nov. 5, 2012 (Fitch et al.);
U.S. patent application Ser. No. 13/771,508 for an Optical Redirection Adapter, filed Feb. 20, 2013 (Anderson);
U.S. patent application Ser. No. 13/852,097 for a System and Method for Capturing and Preserving Vehicle Event Data, filed Mar. 28, 2013 (Barker et al.);
U.S. patent application Ser. No. 13/902,110 for a System and Method for Display of Information Using a Vehicle-Mount Computer, filed May 24, 2013 (Hollifield);
U.S. patent application Ser. No. 13/902,144, for a System and Method for Display of Information Using a Vehicle-Mount Computer, filed May 24, 2013 (Chamberlin);
U.S. patent application Ser. No. 13/902,242 for a System For Providing A Continuous Communication Link With A Symbol Reading Device, filed May 24, 2013 (Smith et al.);
U.S. patent application Ser. No. 13/912,262 for a Method of Error Correction for 3D Imaging Device, filed Jun. 7, 2013 (Jovanovski et al.);
U.S. patent application Ser. No. 13/912,702 for a System and Method for Reading Code Symbols at Long Range Using Source Power Control, filed Jun. 7, 2013 (Xian et al.);
U.S. patent application Ser. No. 29/458,405 for an Electronic Device, filed Jun. 19, 2013 (Fitch et al.);
U.S. patent application Ser. No. 13/922,339 for a System and Method for Reading Code Symbols Using a Variable Field of View, filed Jun. 20, 2013 (Xian et al.);
U.S. patent application Ser. No. 13/927,398 for a Code Symbol Reading System Having Adaptive Autofocus, filed Jun. 26, 2013 (Todeschini);
U.S. patent application Ser. No. 13/930,913 for a Mobile Device Having an Improved User Interface for Reading Code Symbols, filed Jun. 28, 2013 (Gelay et al.);
U.S. patent application Ser. No. 29/459,620 for an Electronic Device Enclosure, filed Jul. 2, 2013 (London et al.);
U.S. patent application Ser. No. 29/459,681 for an Electronic Device Enclosure, filed Jul. 2, 2013 (Chaney et al.);
U.S. patent application Ser. No. 13/933,415 for an Electronic Device Case, filed Jul. 2, 2013 (London et al.);
U.S. patent application Ser. No. 29/459,785 for a Scanner and Charging Base, filed Jul. 3, 2013 (Fitch et al.);
U.S. patent application Ser. No. 29/459,823 for a Scanner, filed Jul. 3, 2013 (Zhou et al.);
U.S. patent application Ser. No. 13/947,296 for a System and Method for Selectively Reading Code Symbols, filed Jul. 22, 2013 (Rueblinger et al.);
U.S. patent application Ser. No. 13/950,544 for a Code Symbol Reading System Having Adjustable Object Detection, filed Jul. 25, 2013 (Jiang);
U.S. patent application Ser. No. 13/961,408 for a Method for Manufacturing Laser Scanners, filed Aug. 7, 2013 (Saber et al.);
U.S. patent application Ser. No. 14/018,729 for a Method for Operating a Laser Scanner, filed Sep. 5, 2013 (Feng et al.);
U.S. patent application Ser. No. 14/019,616 for a Device Having Light Source to Reduce Surface Pathogens, filed Sep. 6, 2013 (Todeschini);
U.S. patent application Ser. No. 14/023,762 for a Handheld Indicia Reader Having Locking Endcap, filed Sep. 11, 2013 (Gannon);
U.S. patent application Ser. No. 14/035,474 for Augmented-Reality Signature Capture, filed Sep. 24, 2013 (Todeschini);
U.S. patent application Ser. No. 29/468,118 for an Electronic Device Case, filed Sep. 26, 2013 (Oberpriller et al.);
U.S. patent application Ser. No. 14/055,234 for Dimensioning System, filed Oct. 16, 2013 (Fletcher);
U.S. patent application Ser. No. 14/053,314 for Indicia Reader, filed Oct. 14, 2013 (Huck);
U.S. patent application Ser. No. 14/065,768 for Hybrid System and Method for Reading Indicia, filed Oct. 29, 2013 (Meier et al.);
U.S. patent application Ser. No. 14/074,746 for Self-Checkout Shopping System, filed Nov. 8, 2013 (Hejl et al.);
U.S. patent application Ser. No. 14/074,787 for Method and System for Configuring Mobile Devices via NFC Technology, filed Nov. 8, 2013 (Smith et al.);
U.S. patent application Ser. No. 14/087,190 for Optimal Range Indicators for Bar Code Validation, filed Nov. 22, 2013 (Hejl);
U.S. patent application Ser. No. 14/094,087 for Method and System for Communicating Information in an Digital Signal, filed Dec. 2, 2013 (Peake et al.);
U.S. patent application Ser. No. 14/101,965 for High Dynamic-Range Indicia Reading System, filed Dec. 10, 2013 (Xian);
U.S. patent application Ser. No. 14/150,393 for Indicia-reader Having Unitary Construction Scanner, filed Jan. 8, 2014 (Colavito et al.);
U.S. patent application Ser. No. 14/154,207 for Laser Barcode Scanner, filed Jan. 14, 2014 (Hou et al.);

U.S. patent application Ser. No. 14/165,980 for System and Method for Measuring Irregular Objects with a Single Camera filed Jan. 28, 2014 (Li et al.);

U.S. patent application Ser. No. 14/166,103 for Indicia Reading Terminal Including Optical Filter filed Jan. 28, 2014 (Lu et al.);

U.S. patent application Ser. No. 14/200,405 for Indicia Reader for Size-Limited Applications filed Mar. 7, 2014 (Feng et al.);

U.S. patent application Ser. No. 14/231,898 for Hand-Mounted Indicia-Reading Device with Finger Motion Triggering filed Apr. 1, 2014 (Van Horn et al.);

U.S. patent application Ser. No. 14/250,923 for Reading Apparatus Having Partial Frame Operating Mode filed Apr. 11, 2014, (Deng et al.);

U.S. patent application Ser. No. 14/257,174 for Imaging Terminal Having Data Compression filed Apr. 21, 2014, (Barber et al.);

U.S. patent application Ser. No. 14/257,364 for Docking System and Method Using Near Field Communication filed Apr. 21, 2014 (Showering);

U.S. patent application Ser. No. 14/264,173 for Autofocus Lens System for Indicia Readers filed Apr. 29, 2014 (Ackley et al.);

U.S. patent application Ser. No. 14/274,858 for Mobile Printer with Optional Battery Accessory filed May 12, 2014 (Marty et al.);

U.S. patent application Ser. No. 14/277,337 for MULTIPURPOSE OPTICAL READER, filed May 14, 2014 (Jovanovski et al.);

U.S. patent application Ser. No. 14/283,282 for TERMINAL HAVING ILLUMINATION AND FOCUS CONTROL filed May 21, 2014 (Liu et al.);

U.S. patent application Ser. No. 14/300,276 for METHOD AND SYSTEM FOR CONSIDERING INFORMATION ABOUT AN EXPECTED RESPONSE WHEN PERFORMING SPEECH RECOGNITION, filed Jun. 10, 2014 (Braho et al.);

U.S. patent application Ser. No. 14/305,153 for INDICIA READING SYSTEM EMPLOYING DIGITAL GAIN CONTROL filed Jun. 16, 2014 (Xian et al.);

U.S. patent application Ser. No. 14/310,226 for AUTOFOCUSING OPTICAL IMAGING DEVICE filed Jun. 20, 2014 (Koziol et al.);

U.S. patent application Ser. No. 14/327,722 for CUSTOMER FACING IMAGING SYSTEMS AND METHODS FOR OBTAINING IMAGES filed Jul. 10, 2014 (Oberpriller et al,);

U.S. patent application Ser. No. 14/327,827 for a MOBILE-PHONE ADAPTER FOR ELECTRONIC TRANSACTIONS, filed Jul. 10, 2014 (Hejl);

U.S. patent application Ser. No. 14/329,303 for CELL PHONE READING MODE USING IMAGE TIMER filed Jul. 11, 2014 (Coyle);

U.S. patent application Ser. No. 14/333,588 for SYMBOL READING SYSTEM WITH INTEGRATED SCALE BASE filed Jul. 17, 2014 (Barten);

U.S. patent application Ser. No. 14/334,934 for a SYSTEM AND METHOD FOR INDICIA VERIFICATION, filed Jul. 18, 2014 (Hejl);

U.S. patent application Ser. No. 14/336,188 for METHOD OF AND SYSTEM FOR DETECTING OBJECT WEIGHING INTERFERENCES, Filed Jul. 21, 2014 (Amundsen et al.);

U.S. patent application Ser. No. 14/339,708 for LASER SCANNING CODE SYMBOL READING SYSTEM, filed Jul. 24, 2014 (Xian et al.);

U.S. patent application Ser. No. 14/340,627 for an AXIALLY REINFORCED FLEXIBLE SCAN ELEMENT, filed Jul. 25, 2014 (Rueblinger et al.);

U.S. patent application Ser. No. 14/340,716 for an OPTICAL IMAGER AND METHOD FOR CORRELATING A MEDICATION PACKAGE WITH A PATIENT, filed Jul. 25, 2014 (Ellis);

U.S. patent application Ser. No. 14/342,544 for Imaging Based Barcode Scanner Engine with Multiple Elements Supported on a Common Printed Circuit Board filed Mar. 4, 2014 (Liu et al.);

U.S. patent application Ser. No. 14/345,735 for Optical Indicia Reading Terminal with Combined Illumination filed Mar. 19, 2014 (Ouyang);

U.S. patent application Ser. No. 14/336,188 for METHOD OF AND SYSTEM FOR DETECTING OBJECT WEIGHING INTERFERENCES, Filed Jul. 21, 2014 (Amundsen et al.);

U.S. patent application Ser. No. 14/355,613 for Optical Indicia Reading Terminal with Color Image Sensor filed May 1, 2014 (Lu et al.);

U.S. patent application Ser. No. 14/370,237 for WEB-BASED SCAN-TASK ENABLED SYSTEM AND METHOD OF AND APPARATUS FOR DEVELOPING AND DEPLOYING THE SAME ON A CLIENT-SERVER NETWORK filed Jul. 2, 2014 (Chen et al.);

U.S. patent application Ser. No. 14/370,267 for INDUSTRIAL DESIGN FOR CONSUMER DEVICE BASED SCANNING AND MOBILITY, filed Jul. 2, 2014 (Ma et al.);

U.S. patent application Ser. No. 14/376,472, for an ENCODED INFORMATION READING TERMINAL INCLUDING HTTP SERVER, filed Aug. 4, 2014 (Lu);

U.S. patent application Ser. No. 14/379,057 for METHOD OF USING CAMERA SENSOR INTERFACE TO TRANSFER MULTIPLE CHANNELS OF SCAN DATA USING AN IMAGE FORMAT filed Aug. 15, 2014 (Wang et al.);

U.S. patent application Ser. No. 14/452,697 for INTERACTIVE INDICIA READER, filed Aug. 6, 2014 (Todeschini);

U.S. patent application Ser. No. 14/453,019 for DIMENSIONING SYSTEM WITH GUIDED ALIGNMENT, filed Aug. 6, 2014 (Li et al.);

U.S. patent application Ser. No. 14/460,387 for APPARATUS FOR DISPLAYING BAR CODES FROM LIGHT EMITTING DISPLAY SURFACES filed Aug. 15, 2014 (Van Horn et al.);

U.S. patent application Ser. No. 14/460,829 for ENCODED INFORMATION READING TERMINAL WITH WIRELESS PATH SELECTON CAPABILITY, filed Aug. 15, 2014 (Wang et al.);

U.S. patent application Ser. No. 14/462,801 for MOBILE COMPUTING DEVICE WITH DATA COGNITION SOFTWARE, filed on Aug. 19, 2014 (Todeschini et al.);

U.S. patent application Ser. No. 14/446,387 for INDICIA READING TERMINAL PROCESSING PLURALITY OF FRAMES OF IMAGE DATA RESPONSIVELY TO TRIGGER SIGNAL ACTIVATION filed Jul. 30, 2014 (Wang et al.);

U.S. patent application Ser. No. 14/446,391 for MULTIFUNCTION POINT OF SALE APPARATUS WITH OPTICAL SIGNATURE CAPTURE filed Jul. 30, 2014 (Good et al.);

U.S. patent application Ser. No. 29/486,759 for an Imaging Terminal, filed Apr. 2, 2014 (Oberpriller et al.);

U.S. patent application Ser. No. 29/492,903 for an INDICIA SCANNER, filed Jun. 4, 2014 (Zhou et al.); and U.S. patent application Ser. No. 29/494,725 for an IN-COUNTER BARCODE SCANNER, filed Jun. 24, 2014 (Oberpriller et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

What is claimed is:

1. A method for presenting information related to a power level of a mobile device used with a radio frequency (RF) scanner for processing information scanned therewith, the method comprising:
  without requiring user intervention, automatically polling the mobile device, from the RF scanner, in relation to a power level present in a battery source providing power to the mobile device;
  checking the power level present in the battery source providing power to the mobile device;
  responsive to the polling, reporting to the RF scanner data relating to the checked power level present in the battery source providing power to the mobile device;
  in the RF scanner:
  processing the reported data relating to the checked power level present in the battery source providing power to the mobile device;
  evaluating the processed data reported in relation to the power level present in the battery source providing power to the mobile device;
  upon the evaluation detecting that the processed data indicate that the power level present in the battery source providing power to the mobile device is at or below a low power set point, commanding a presentation of a corresponding alert relating to the detected low power level present in the battery providing power to the mobile device; and
  presenting the corresponding alert relating to the detected low power level present in the battery providing power to the mobile device on an indicator component of the RF scanner.

2. The method as described in claim 1 further comprising the RF scanner presenting the corresponding alert on an indicator remote therefrom.

3. The method as described in claim 2 wherein the RF scanner presenting the corresponding alert on an indicator remote therefrom comprises presenting the corresponding alert with an indicator associated with the mobile device.

4. The method as described in claim 3 wherein the presenting the corresponding alert with an indicator component of the mobile device comprises rendering a representation related to the corresponding alert on a display component of the mobile device.

5. The method as described in claim 2 wherein the RF scanner presenting the corresponding alert on an indicator remote therefrom comprises presenting the corresponding alert with an indicator associated with a computer, which is used with the mobile device and the RF scanner.

6. The method as described in claim 5 wherein the presenting the corresponding alert on an indicator associated with a computer comprises rendering a representation related to the corresponding alert on a display associated with the computer.

7. The method as described in claim 1 wherein the polling the mobile device, from the RF scanner, in relation to the power level present in a battery source providing power to the mobile device, comprises transmitting a corresponding message from the RF scanner to the mobile device.

8. The method as described in claim 1 wherein the checking the power level present in the battery source providing power to the mobile device is performed discretely in response to the polling.

9. The method as described in claim 1 wherein the checking the power level present in the battery source providing power to the mobile device is performed continuously or periodically.

10. The method as described in claim 1 wherein the RF scanner commanding a presentation of a corresponding alert comprises transmitting a corresponding command message from the RF scanner to the mobile device.

11. The method as described in claim 10 wherein the RF scanner commanding a presentation of a corresponding alert comprises transmitting a corresponding command message from one or more of the RF scanner or the mobile device to a computer used therewith.

12. A scanning system, comprising:
  a mobile device operable for processing scan related information, and comprising an on-board battery power source and a component operable for sensing a power level present in the battery; and
  a radio frequency (RF) scanner coupled over a communicative link with the mobile device and operable for scanning a potential source of information, accessing corresponding scan data upon detecting the information, modulating the accessed scan data, and transmitting a scan data signal, which comprises the modulated scan data and corresponds to the scan related information, to the mobile device, and wherein the RF scanner is further operable for automatically polling the mobile device in relation to the sensed power level present in the battery power source thereof without requiring user intervention;
  wherein the mobile device is further operable responsive to the polling for reporting to the RF scanner data in relation to the sensed power level present in the battery source providing power to the mobile device; and
  wherein the RF scanner is further operable for:
  processing the reported data relating to the sensed power level present in the battery source providing power to the mobile device;
  evaluating the processed data relating to the sensed power level present in the battery source providing power to the mobile device;
  upon the evaluation detecting that the processed data indicate that the power level present in the battery source providing power to the mobile device is at or below a low power set point, commanding a presentation of a corresponding alert in relation to the detected low power level present in the battery providing power to the mobile device; and
  presenting the corresponding alert with an indicator component of the RF scanner.

13. The system as described in claim 12 wherein the RF scanner is further operable for presenting the corresponding alert remotely from the RF scanner.

14. The system as described in claim 13 wherein the presenting the corresponding alert remotely comprises presenting the corresponding alert with an indicator associated with the mobile device.

15. The system as described in claim 14 wherein the presenting the corresponding alert with an indicator associated with the mobile device comprises rendering a representation relating to the corresponding alert on a display component of the mobile device.

16. The system as recited in claim 12, further comprising a computer communicatively coupled with the mobile device, wherein the presenting the corresponding alert remotely from the RF scanner comprises presenting the corresponding alert with an indicator associated with the computer.

17. The system as described in claim 16 wherein the presenting the corresponding alert with an indicator associated with the computer comprises rendering a representation relating to the alert on a display associated with the computer.

18. The system as described in claim 12 wherein the sensing the power level present in the battery source providing power to the mobile device is performed discretely in response to the polling.

19. The system as described in claim 12 wherein the sensing the power level present in the battery source providing power to the mobile device is performed continuously or periodically.

20. A method comprising the steps of:
polling a mobile device, from a RF scanner, in relation to a power level present in a battery source providing power to the mobile device;
receiving, with the RF scanner, data relating to the checked power level present in the battery source providing power to the mobile device;
processing, with the RF scanner, the reported data relating to the checked power level present in the battery source providing power to the mobile device;
in response to detecting that the processed data indicates that the power level present in the battery source providing power to the mobile device is at or below a low power set point, commanding, with the RF scanner, a presentation of a corresponding alert relating to the detected low power level present in the battery providing power to the mobile device; and
presenting, with the RF scanner, the corresponding alert relating to the detected low power level present in the battery providing power to the mobile device on an indicator component of the RF scanner.

* * * * *